Figure 1:
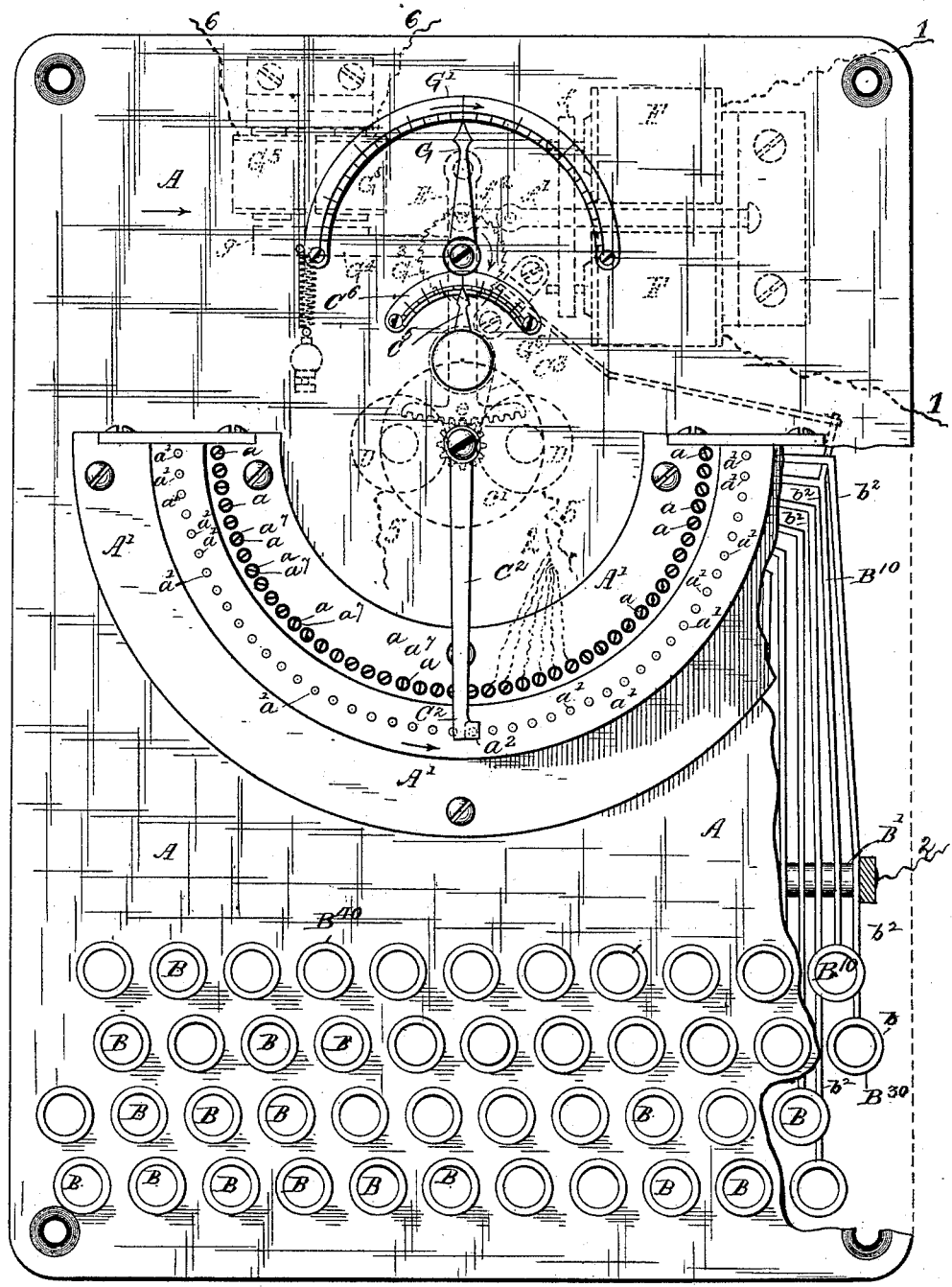

(No Model.) 20 Sheets—Sheet 1.

J. B. ODELL.
RECORDING TELEGRAPH.

No. 434,880. Patented Aug. 19, 1890.

Witnesses:
Sam. B. Dover
J. B. MacGreal

Inventor:
John B. Odell
by Geo. W. LeVin
Attorney.

(No Model.) 20 Sheets—Sheet 2.
J. B. ODELL.
RECORDING TELEGRAPH.
No. 434,880. Patented Aug. 19, 1890.

(No Model.) 20 Sheets—Sheet 3.
J. B. ODELL.
RECORDING TELEGRAPH.
No. 434,880. Patented Aug. 19, 1890.
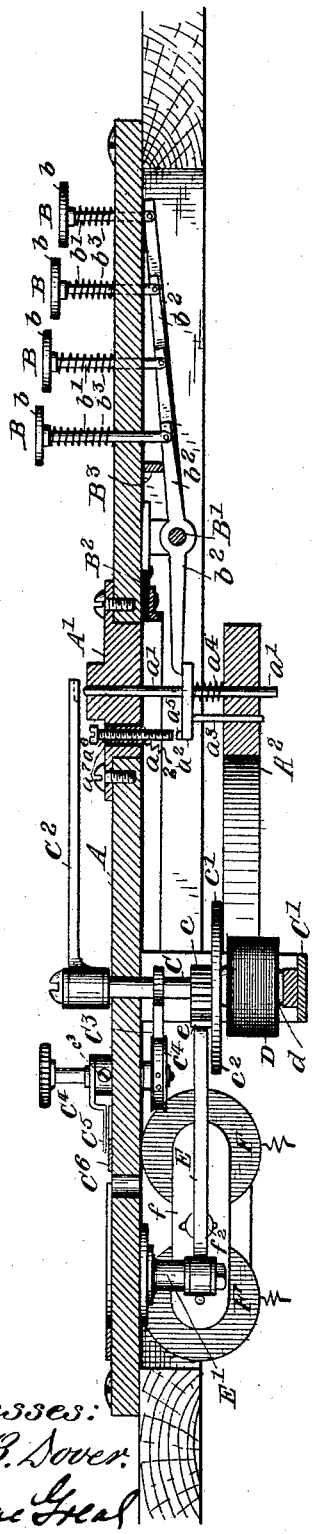
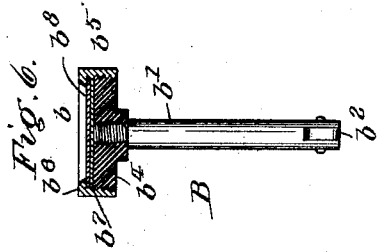
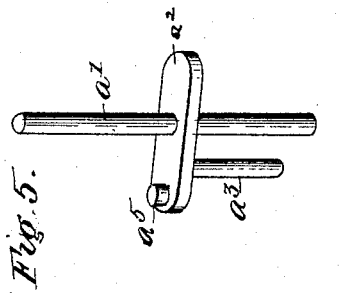
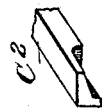
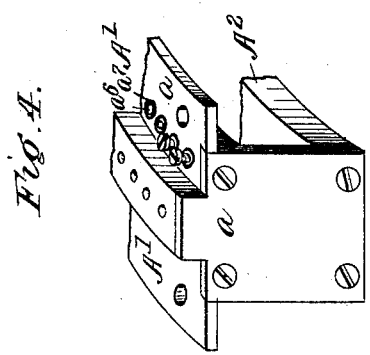
Witnesses:
Sam. B. Dover.
J. M. MacGreal
Inventor.
John B. Odell.
By Geo. W. LeVin.
Attorney.

(No Model.) 20 Sheets—Sheet 4.
J. B. ODELL.
RECORDING TELEGRAPH.
No. 434,880. Patented Aug. 19, 1890.
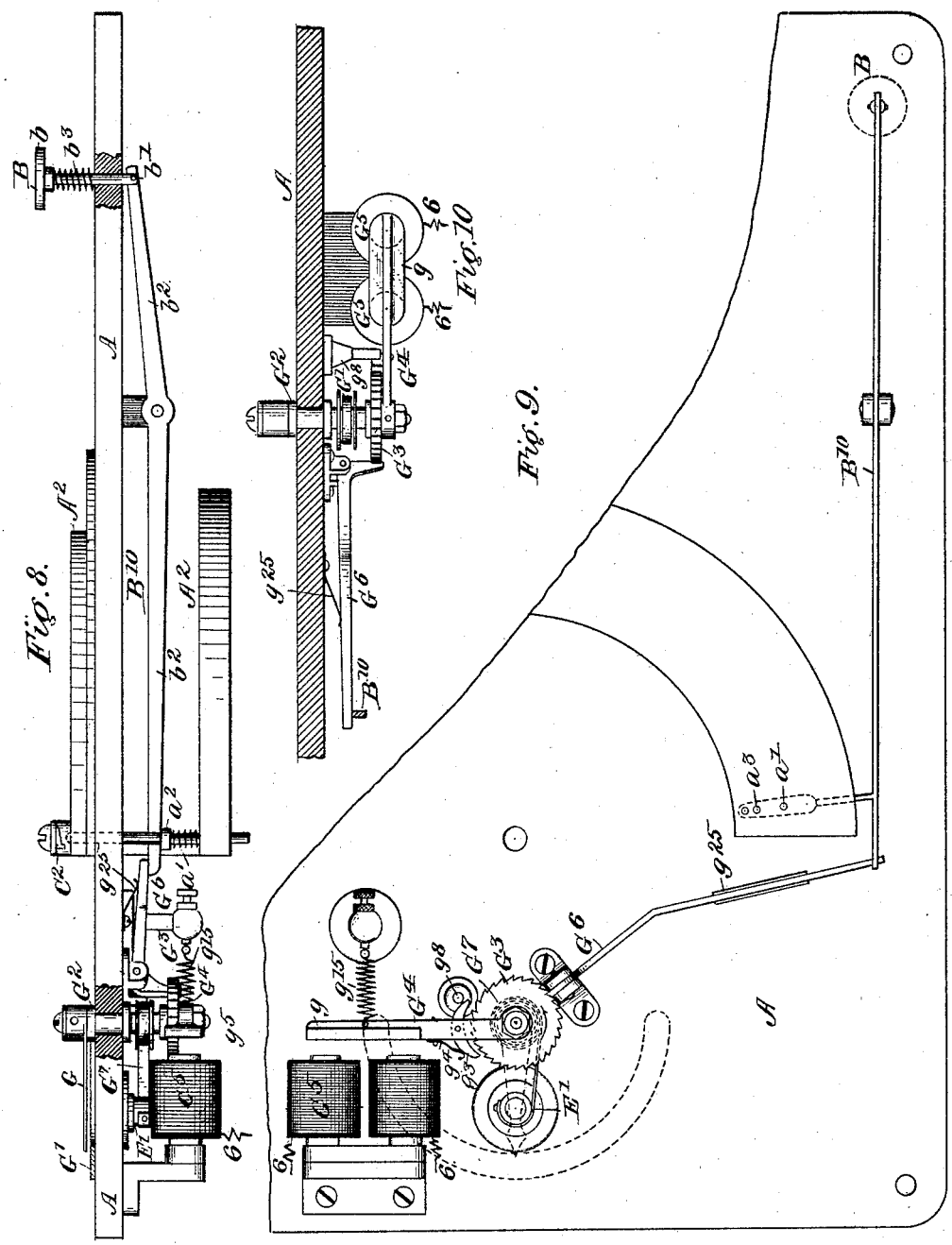
Witnesses:
Sam'l B. Dover.
J. W. MacGreal.
Inventor:
John B. Odell.
by Geo. W. LeVin.
Attorney.

(No Model.) 20 Sheets—Sheet 6.

J. B. ODELL.
RECORDING TELEGRAPH.

No. 434,880. Patented Aug. 19, 1890.

Witnesses:
Sam'l B. Dover
J. M. MacGreal

Inventor:
John B. Odell
by Geo. W. LeVin
Attorney (No Model.) 20 Sheets—Sheet 7.
J. B. ODELL.
RECORDING TELEGRAPH.
No. 434,880. Patented Aug. 19, 1890.
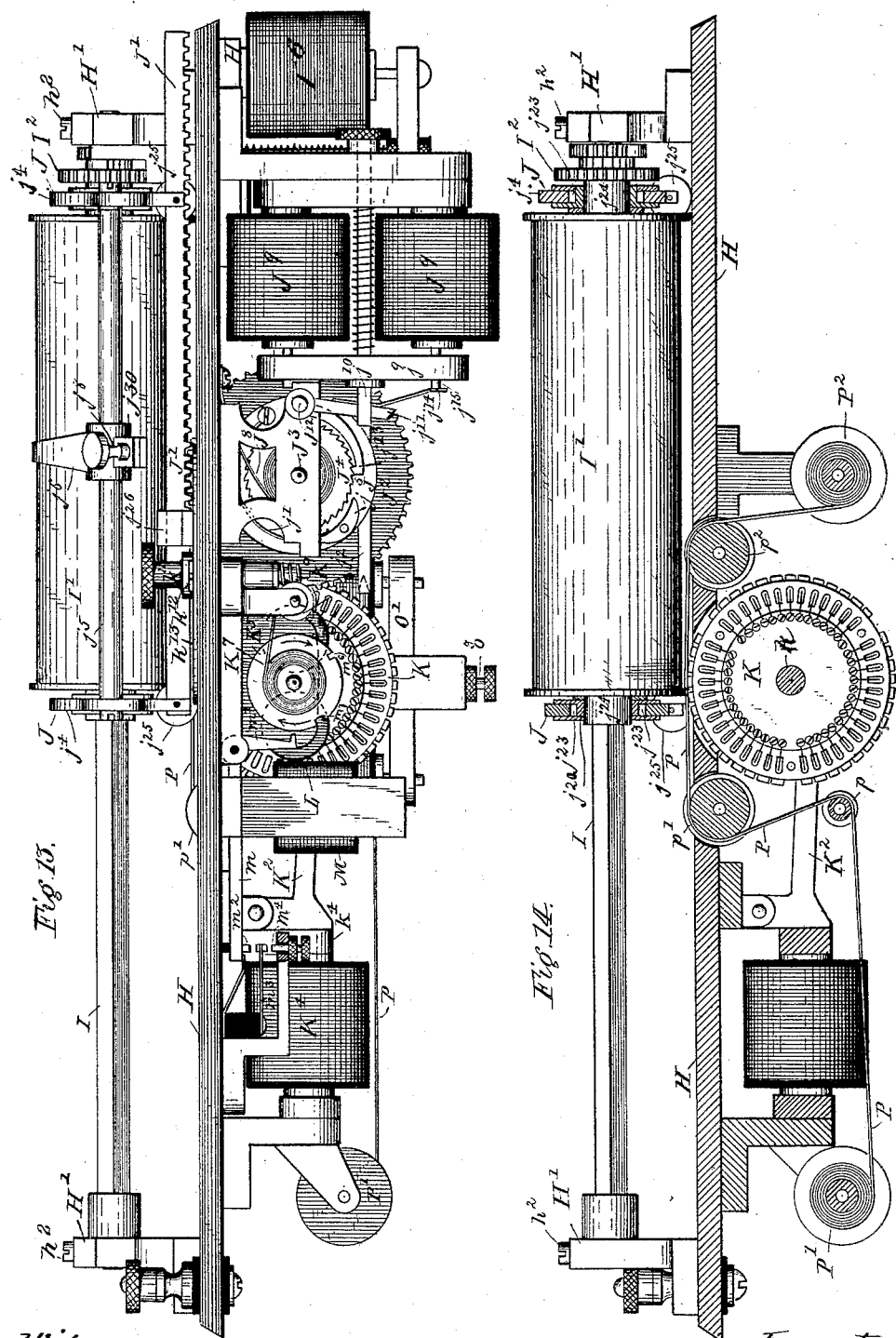
Witnesses:
Sam'l B. Dover.
J. W. MacGreal.
Inventor:
John B. Odell.
by Geo. W. LeVin.
Attorney.

(No Model.) 20 Sheets—Sheet 8.
J. B. ODELL.
RECORDING TELEGRAPH.
No. 434,880. Patented Aug. 19, 1890.
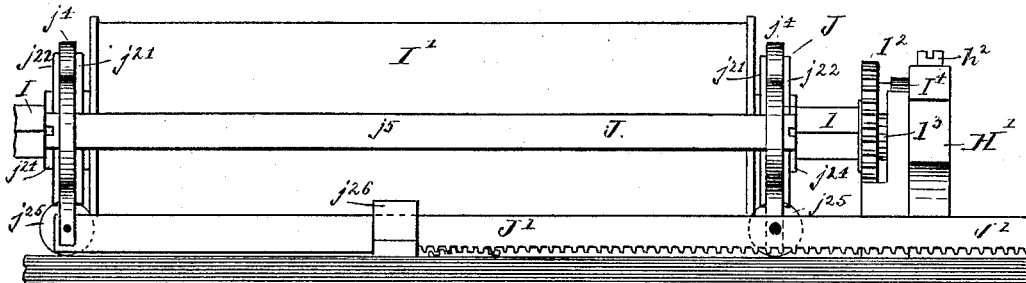
Fig. 15.
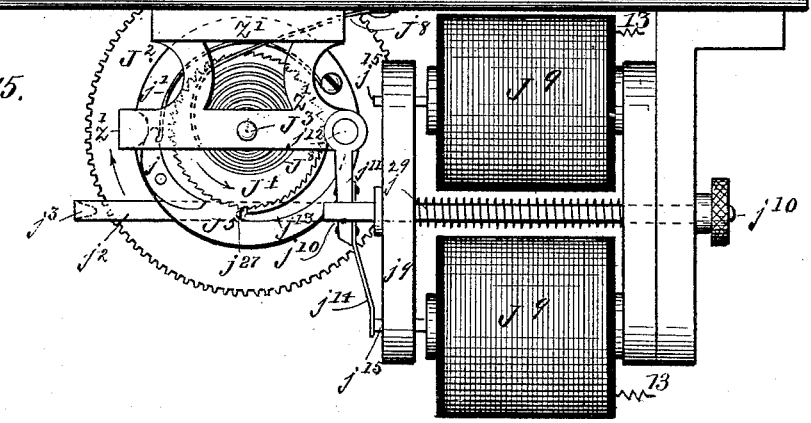
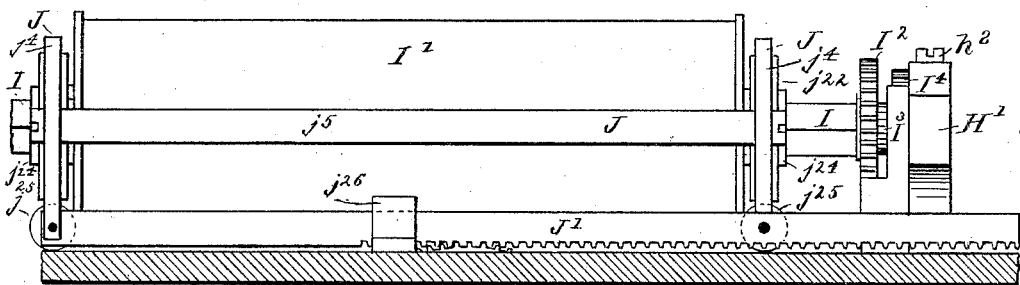
Fig. 16.
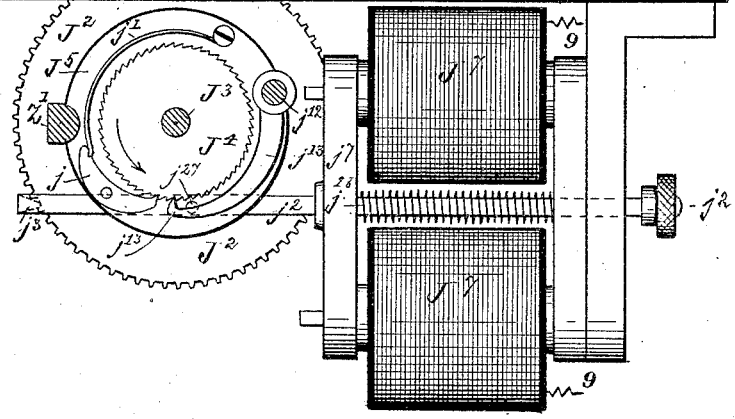
Witnesses:
Sam'l B. Dover.
J. H. MacGreal
Inventor:
John B. Odell.
by Geo. W. LeVis.
Attorney.

(No Model.)  20 Sheets—Sheet 9.
J. B. ODELL.
RECORDING TELEGRAPH.
No. 434,880.  Patented Aug. 19, 1890.
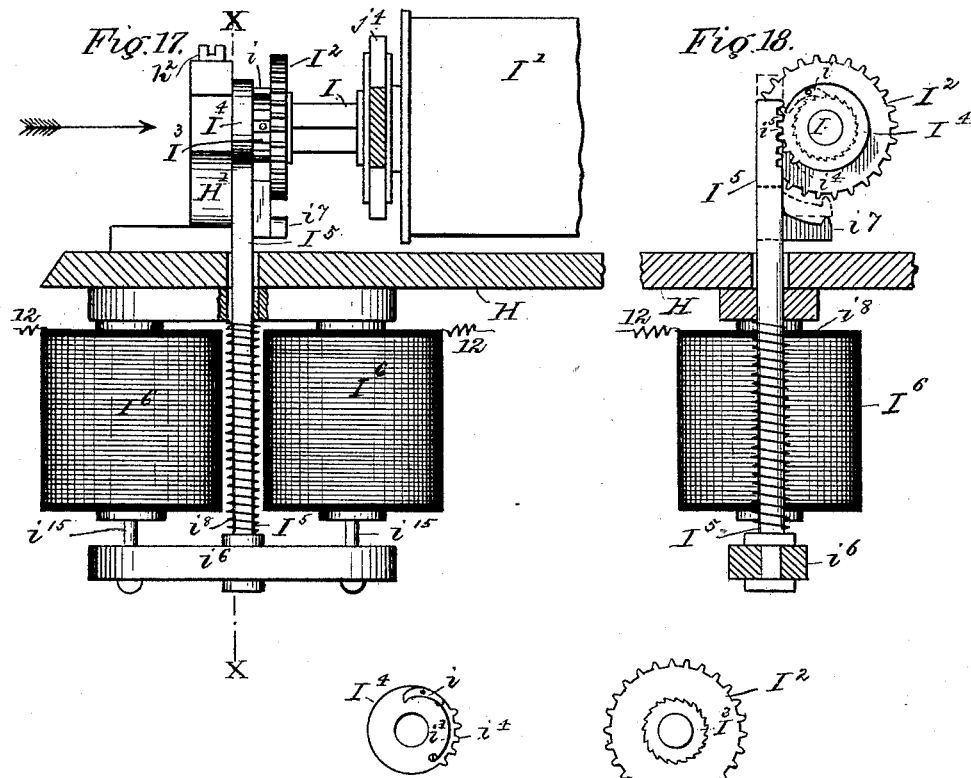
Fig. 17.  Fig. 18.
Fig. 19.  Fig. 20.
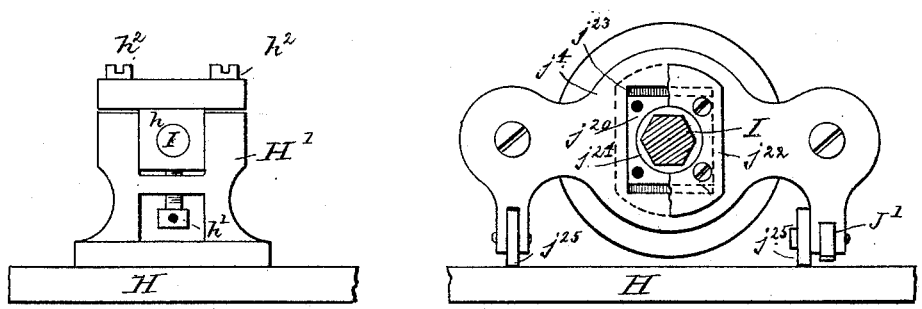
Fig. 21.  Fig. 22.
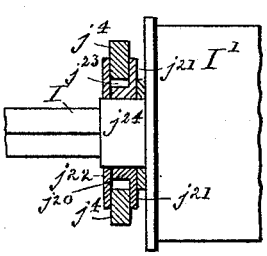
Fig. 23.
Witnesses:
Sam'l B. Dover.
J. M. MacGreal.
Inventor:
John B. Odell.
By Geo. W. LeVieu.
Attorney.
THE NORRIS PETERS CO., PHOTO-LITHO., WASHINGTON, D. C.

(No Model.)
20 Sheets—Sheet 10.
J. B. ODELL.
RECORDING TELEGRAPH.
No. 434,880. Patented Aug. 19, 1890.
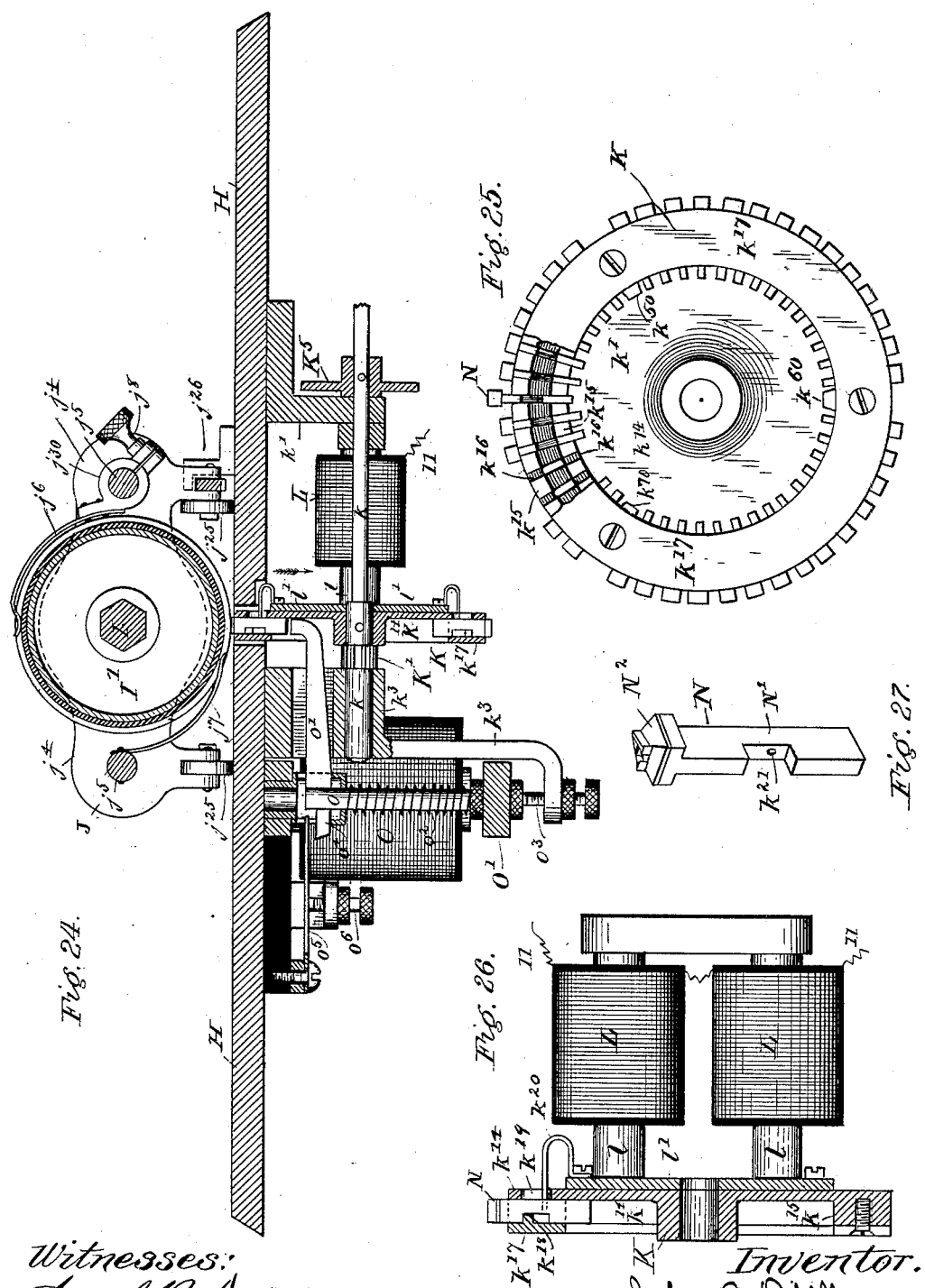
Witnesses:
Sam'l B. Dover.
J. W. MacGreal.
Inventor.
John B. Odell.
By Geo. W. LeVin.
Attorney.

(No Model.) 20 Sheets—Sheet 11.
J. B. ODELL.
RECORDING TELEGRAPH.
No. 434,880. Patented Aug. 19, 1890.
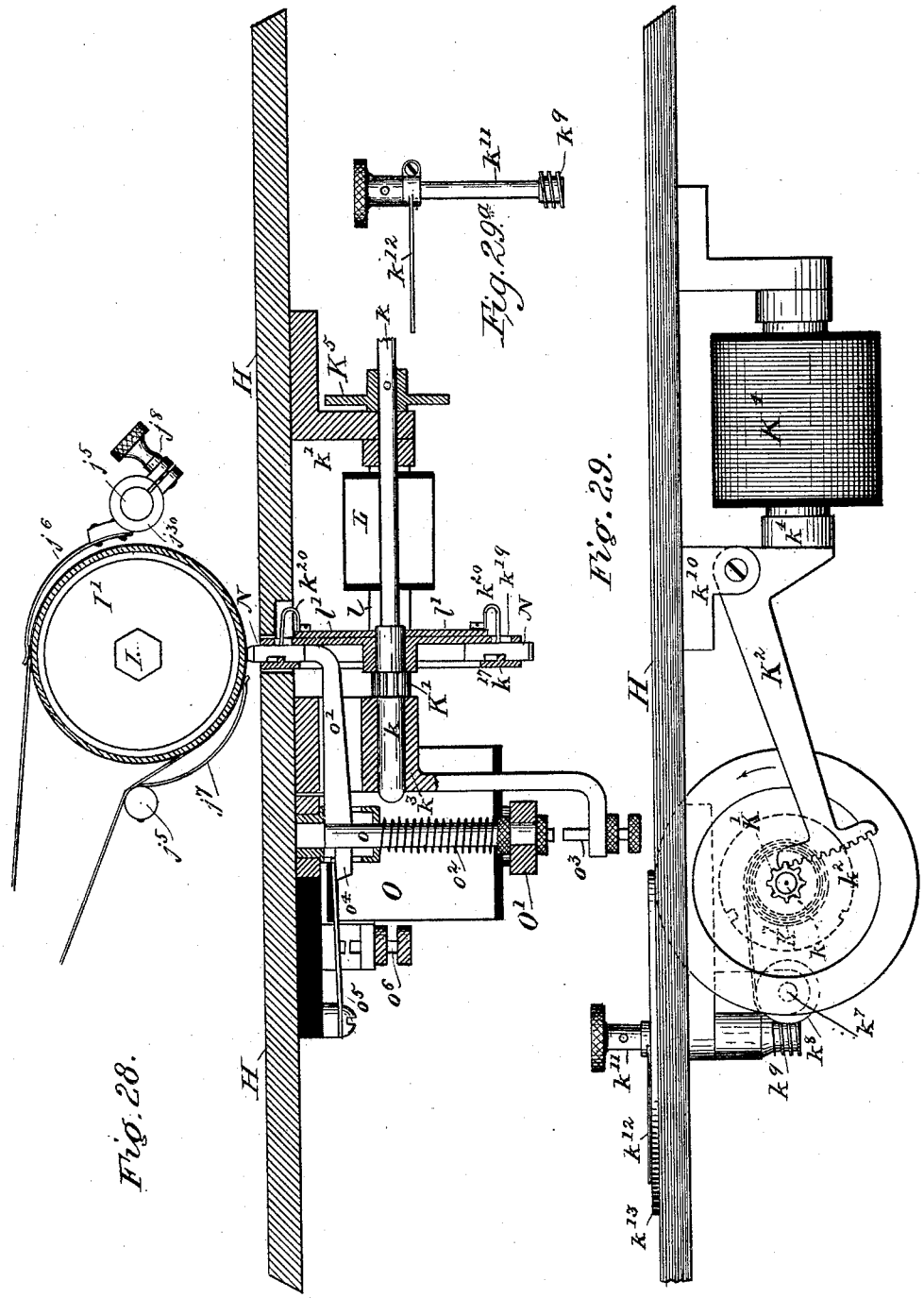
Witnesses:
Sam. B. Dover.
J. W. MacGreal
Inventor:
John B. Odell.
by Geo. W. LeVii.
Attorney.

(No Model.) 20 Sheets—Sheet 12.
J. B. ODELL.
RECORDING TELEGRAPH.

No. 434,880. Patented Aug. 19, 1890.

Witnesses.
Sam'l B Dover.
J. H. Mac Greal.

Inventor:
John B. Odell.
by Geo. W. LeVin.
Attorney.

(No Model.) 20 Sheets—Sheet 13.

J. B. ODELL.
RECORDING TELEGRAPH.

No. 434,880. Patented Aug. 19, 1890.

Witnesses:
Sam'l B. Dover.
J. W. Mac Greal.

Inventor:
John B. Odell.
by Geo. W. Levin.
Attorney.

(No Model.) 20 Sheets—Sheet 14.
J. B. ODELL.
RECORDING TELEGRAPH.

No. 434,880. Patented Aug. 19, 1890.

Witnesses:
B. Dover
J. W. MacGreal

Inventor:
John B. Odell
by Geo. W. LeVin
Attorney.

(No Model.)  20 Sheets—Sheet 18.
J. B. ODELL.
RECORDING TELEGRAPH.

No. 434,880. Patented Aug. 19, 1890.

Witnesses:
J. B. Dover
J. W. MacGreal

Inventor:
John B. Odell
by Geo. W. LeVin
Attorney (No Model.)  20 Sheets—Sheet 19.
J. B. ODELL.
RECORDING TELEGRAPH.
No. 434,880.  Patented Aug. 19, 1890.
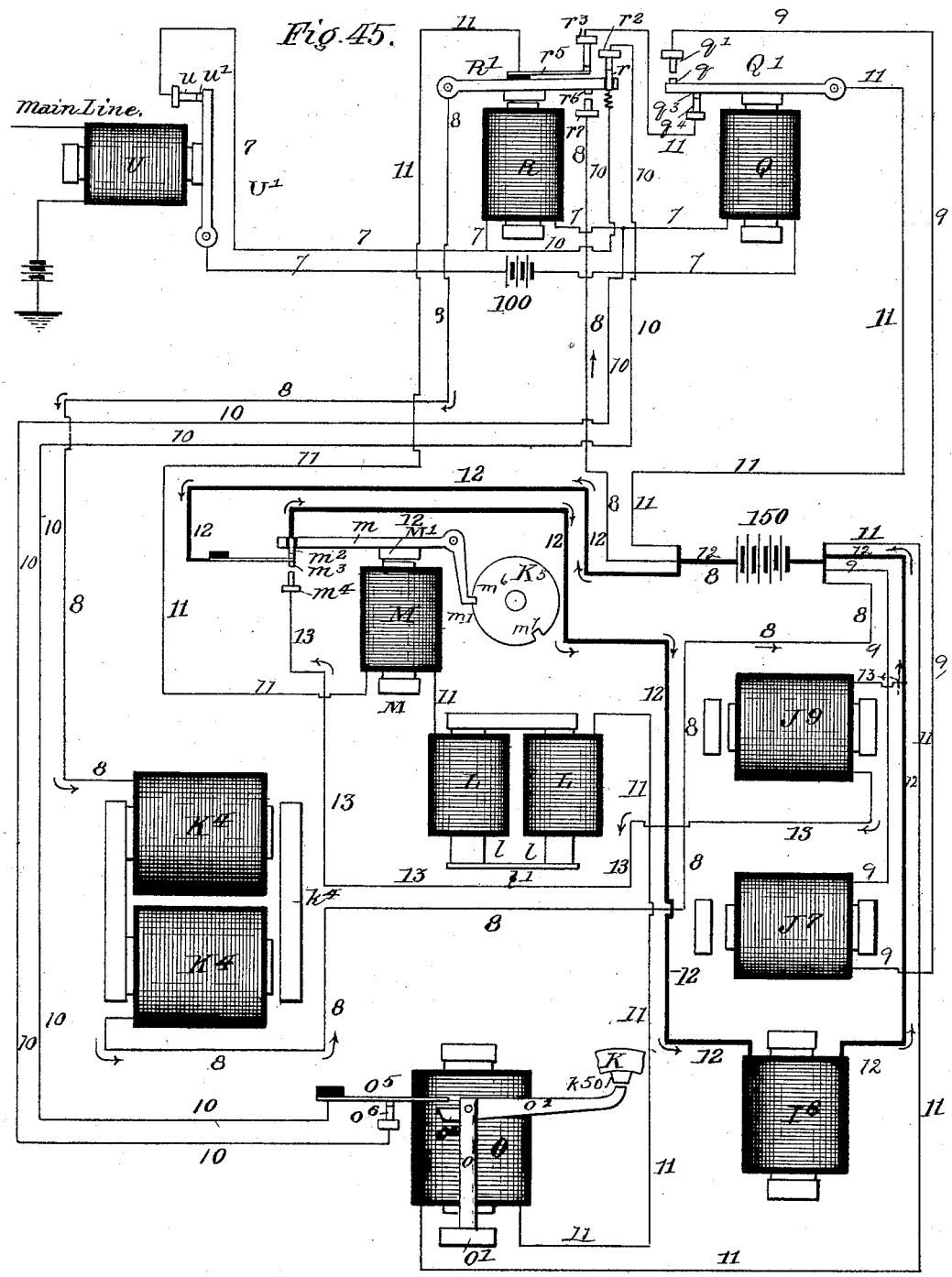
Witnesses:
Sam'l B. Dover
S. W. MacGreal
Inventor:
John B. Odell
By Geo. W. LeVin
Attorney

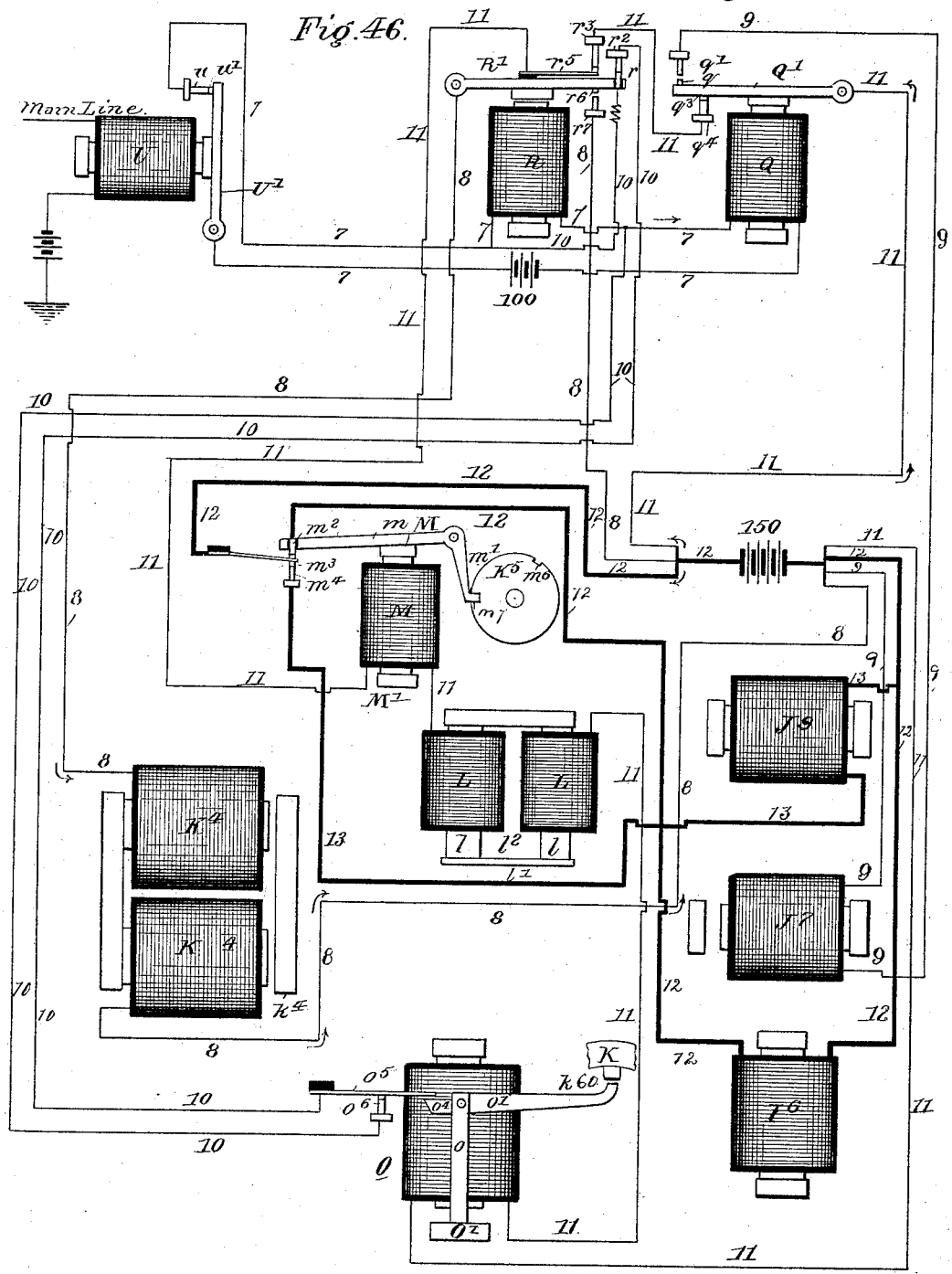

UNITED STATES PATENT OFFICE.

JOHN B. ODELL, OF CHICAGO, ILLINOIS, ASSIGNOR TO THE PRINTING TELEGRAPH COMPANY OF ILLINOIS, OF SAME PLACE.

RECORDING-TELEGRAPH.

SPECIFICATION forming part of Letters Patent No. 434,880, dated August 19, 1890.

Application filed November 21, 1887. Serial No. 255,767. (No model.)

*To all whom it may concern:*

Be it known that I, JOHN B. ODELL, a citizen of the United States, residing at Chicago, in the county of Cook and State of Illinois, have invented certain new and useful Improvements in Recording-Telegraphs, of which the following is a full, clear, and exact description, reference being had to the accompanying drawings, and to the letters of reference marked thereon, which form part of this specification.

The invention relates to improvements in recording-telegraph transmitting and receiving instruments, and the combination and arrangement of electric circuits by which said instruments are severally and conjointly operated, the same consisting in the matters hereinafter set forth, and pointed out in the appended claims.

The prominent features of a recording-telegraph system embodying my invention are as follows: The transmitting-instrument is provided with a suitable number of finger-keys, which represent such characters as would ordinarily be required for printing telegraphic messages. Each of said keys is arranged and adapted to successively put in action devices essentially forming part of said transmitter, which automatically open and close the main-line circuit, and therethrough put in action the receiving-instrument. The relation which the said keys bear to the said devices which effect the opening and closing of the main-line circuit is such that as each individual key puts in action the said devices the main-line circuit is held open for a predetermined period of time, shorter or longer than the period of time which it would be held open by said devices when said devices are put in action by any other one of said keys. The receiver is provided with a movable type-carrier, the action of which is controlled through the opening and closing of the main-line circuit by the said devices of the transmitter, which are put in action by said character finger-keys. The types carried by said carrier correspond in number and operative order of arrangement with the number and operative order of arrangement of the said character finger-keys of the transmitter, their consecutive positions with reference to their carrier having such relation to the operative order of arrangement of said character finger-keys that any desired particular type may be instantly brought into printing position through a single action of the said main-line opening and closing devices of the transmitter, as the said devices are caused to act by a character finger-key corresponding with said type. In other words, as the main line is opened by the said devices of the transmitter, the type-carrier, however distant, is synchronously put in action and continues to move until the main-line circuit is closed by said devices, the period of time which supervenes between the opening and closing of the main-line circuit, predetermined by the character finger-key, which puts said devices in action, determining the length of movement of said type-carrier, and therefore which one of said types shall be brought in printing position. The receiver also embraces devices adapted to arrest the movement of and rigorously hold the type-carrier as a desired type is brought into printing position, the said devices being put in action through the same action of the transmitter which brought about movement of said carrier through the operation of the key corresponding with the type brought into printing position. The receiver also embraces devices adapted to effect the printing operation of the type carried by said carrier, the operation of said devices being brought about by the said main-line-circuit opening and closing devices of the transmitter, and by the same action thereof which brought about movement of the said type-carrier. The receiver also embraces devices which carry the paper upon which the recording of messages is effected through the operation of said type, the said paper-carrying devices being successively carried forward through a step-by-step movement to receive the imprint of the types co-operatively with each printing operation of the type-carrier through the action of said main-line-circuit opening and closing devices of the transmitter as the same are successively put in operation and bring about movement of said type-carrier. The receiver also embraces means for rotatively moving the paper-roller, which forms part of the said paper-carrying devices and devices for retracting said paper-carrying devices, the said rotatively moving and retracting devices being operated through the action of the said main-line-circuit opening and closing devices of the transmitter, as is hereinafter more particularly set forth.

The system embraces other features of invention, all of which are hereinafter particularly described.

Figure 2:
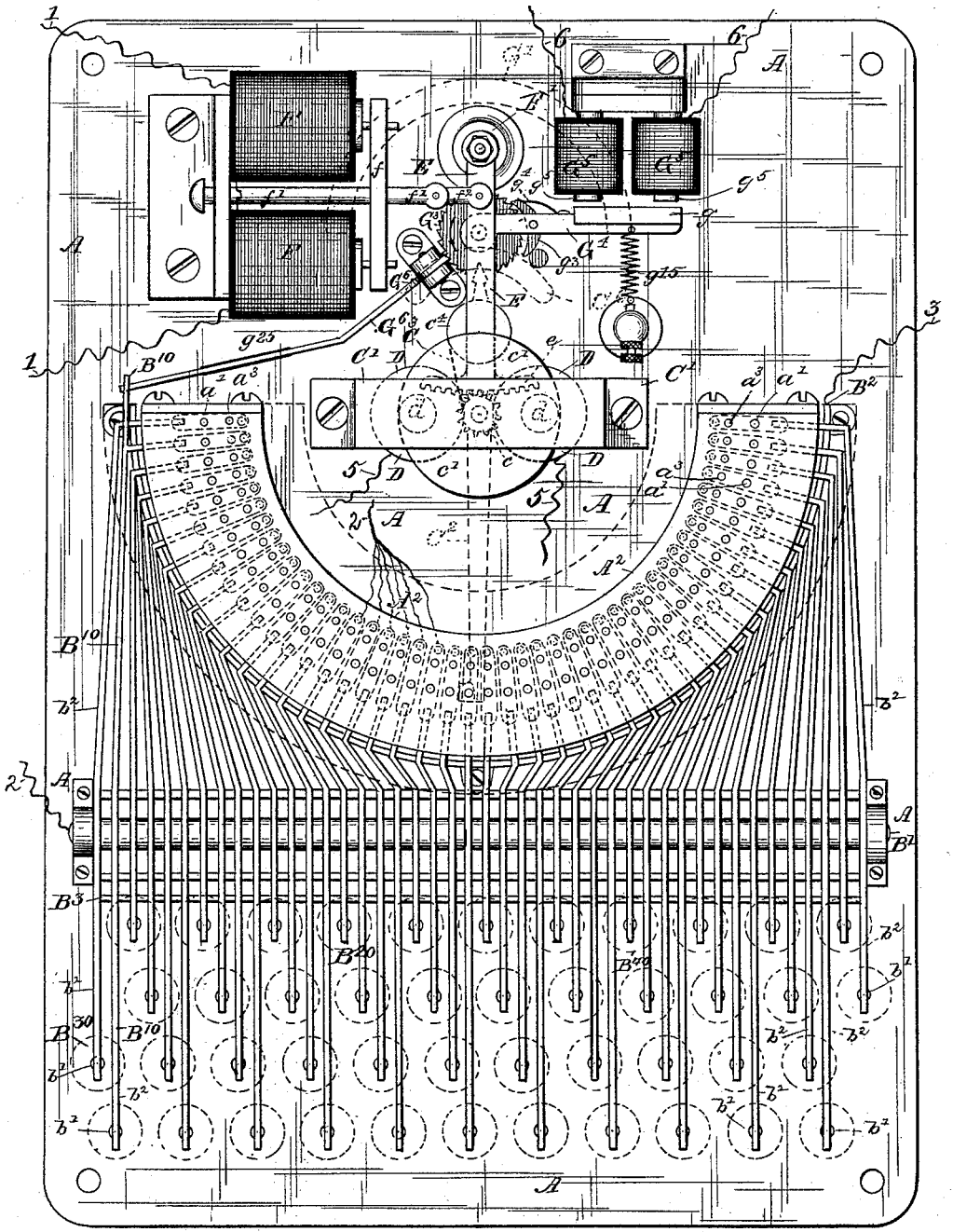
Figure 11:
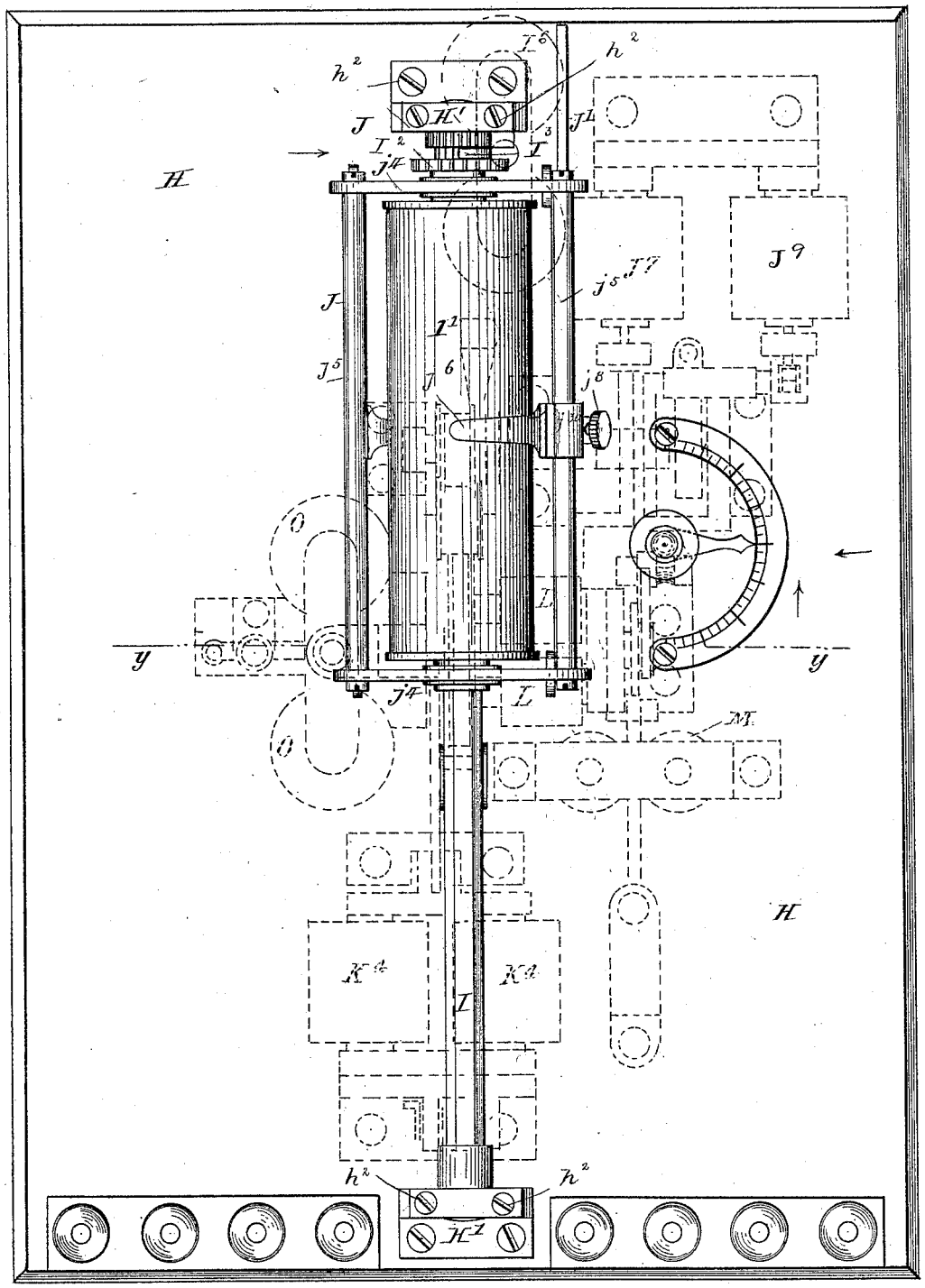
Figure 12:
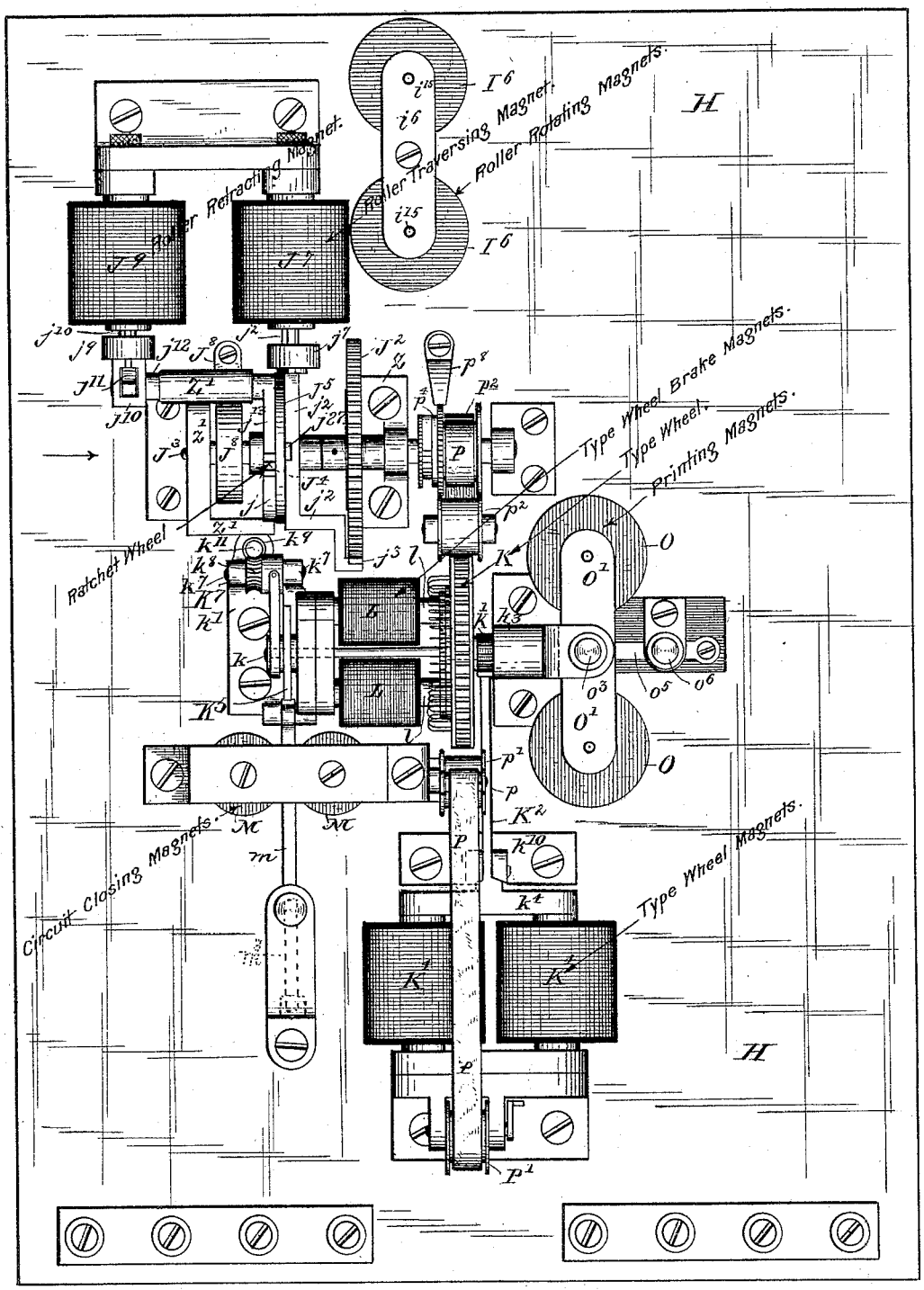
Figure 30:
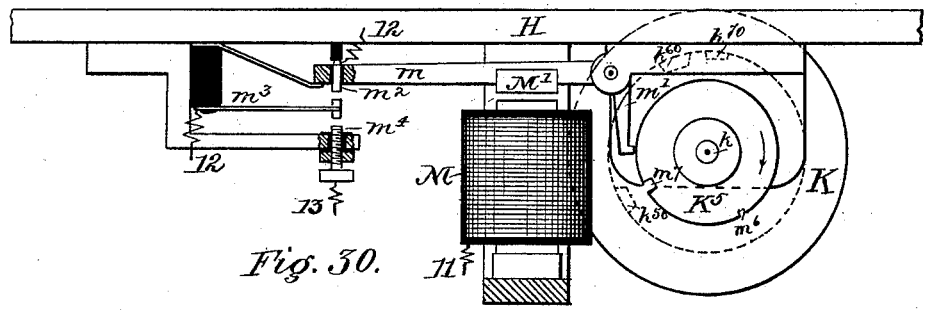
Figure 31:
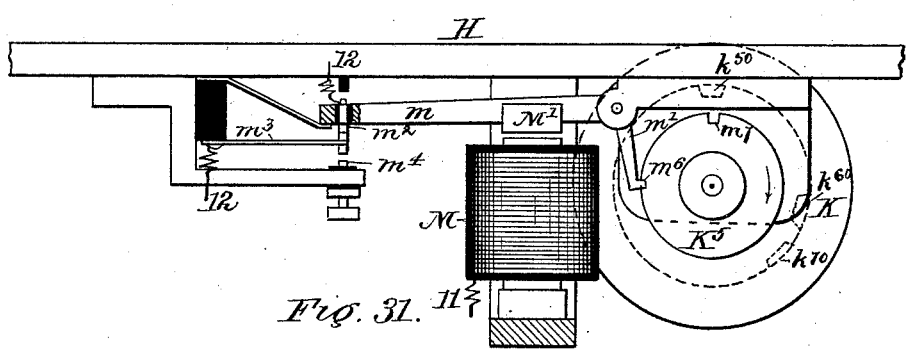
Figure 32:
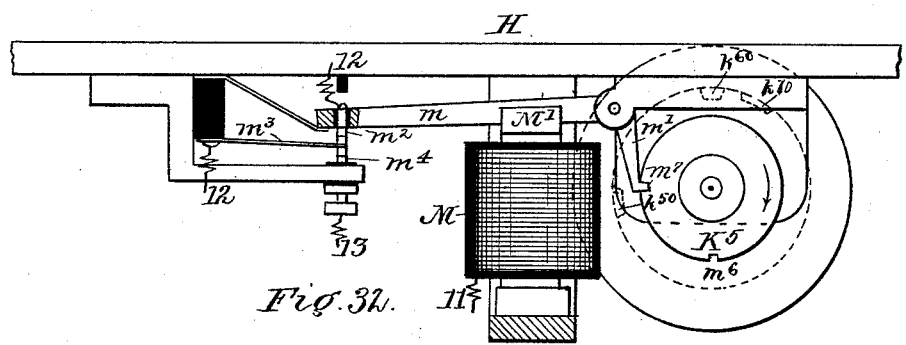
Figures 33, 34, 35, 36:
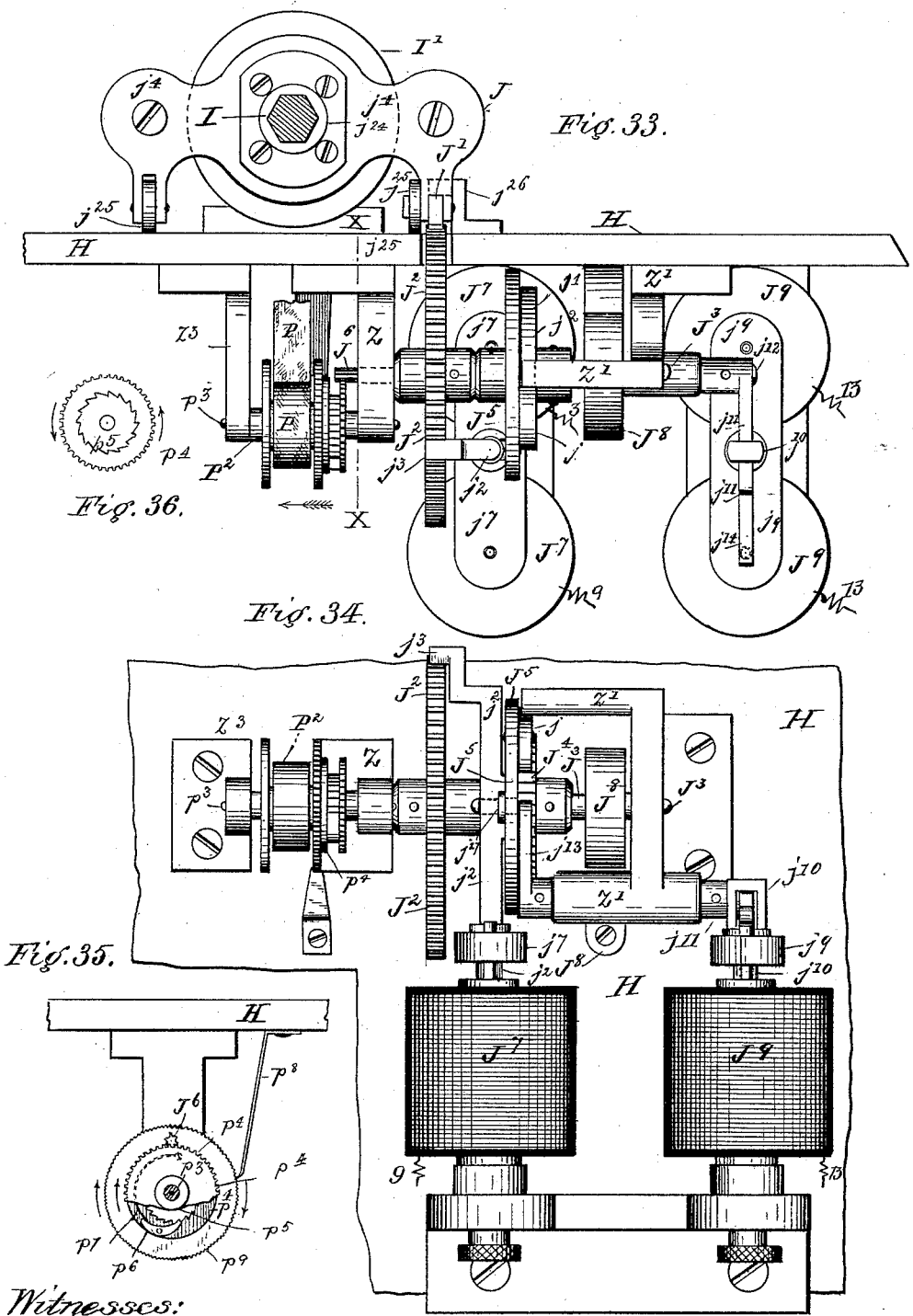
Figure 37:
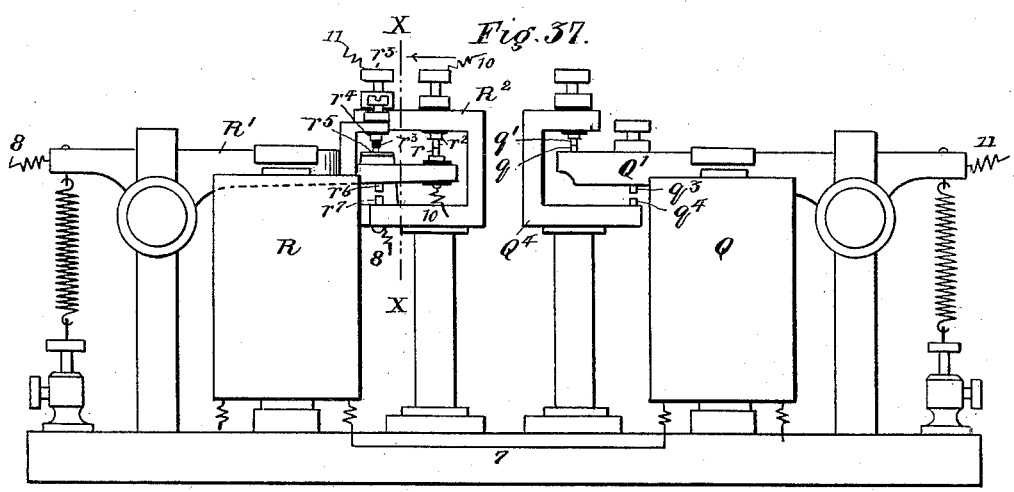
Figure 38:
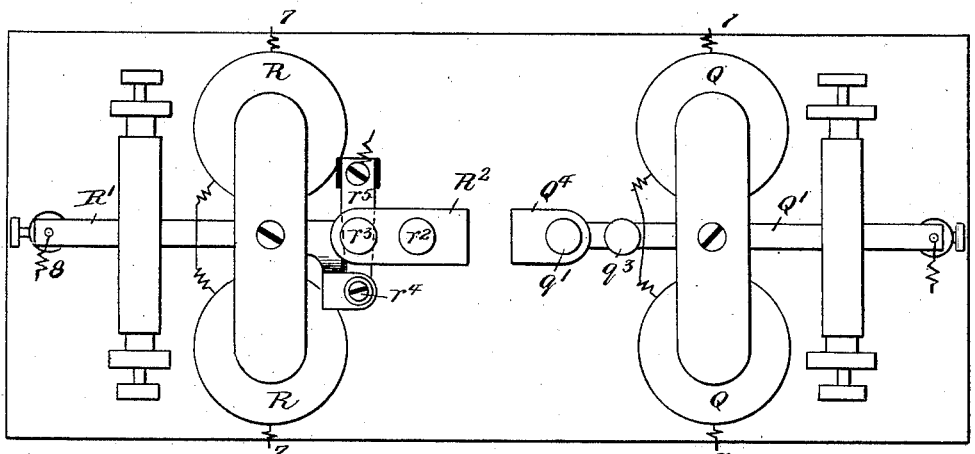
Figure 39:
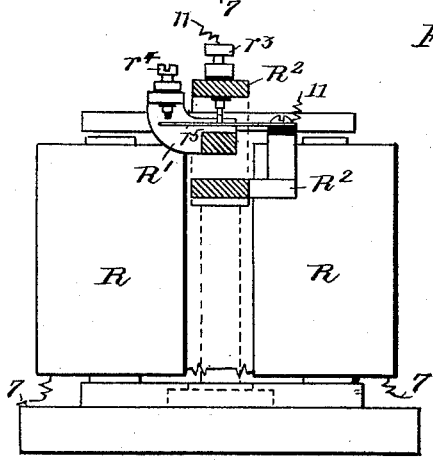
Figure 40:
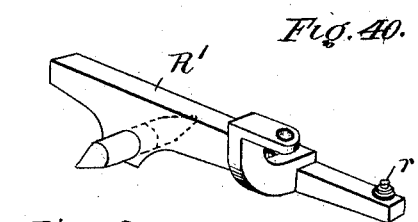
Figure 41:
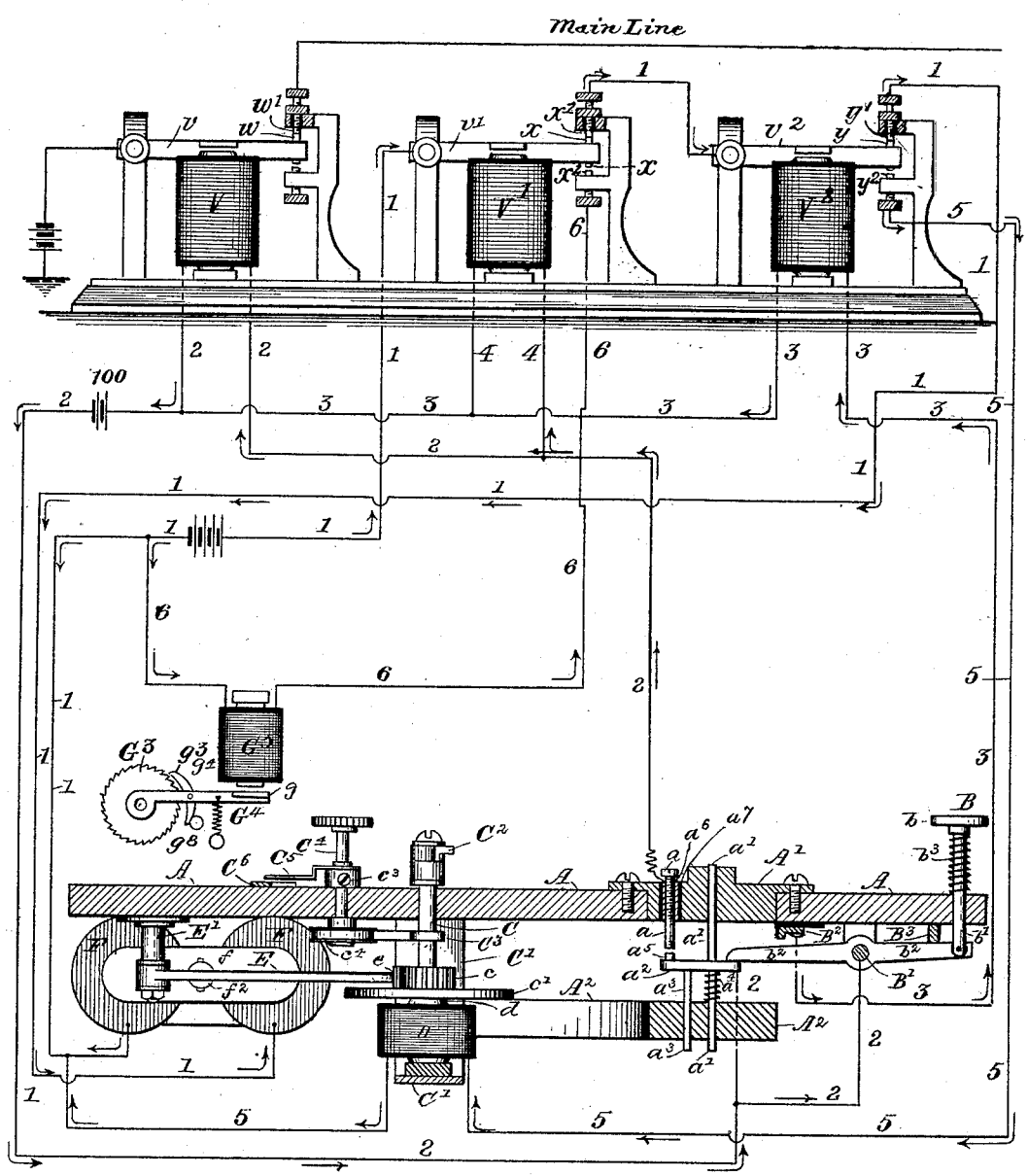
Figure 42:
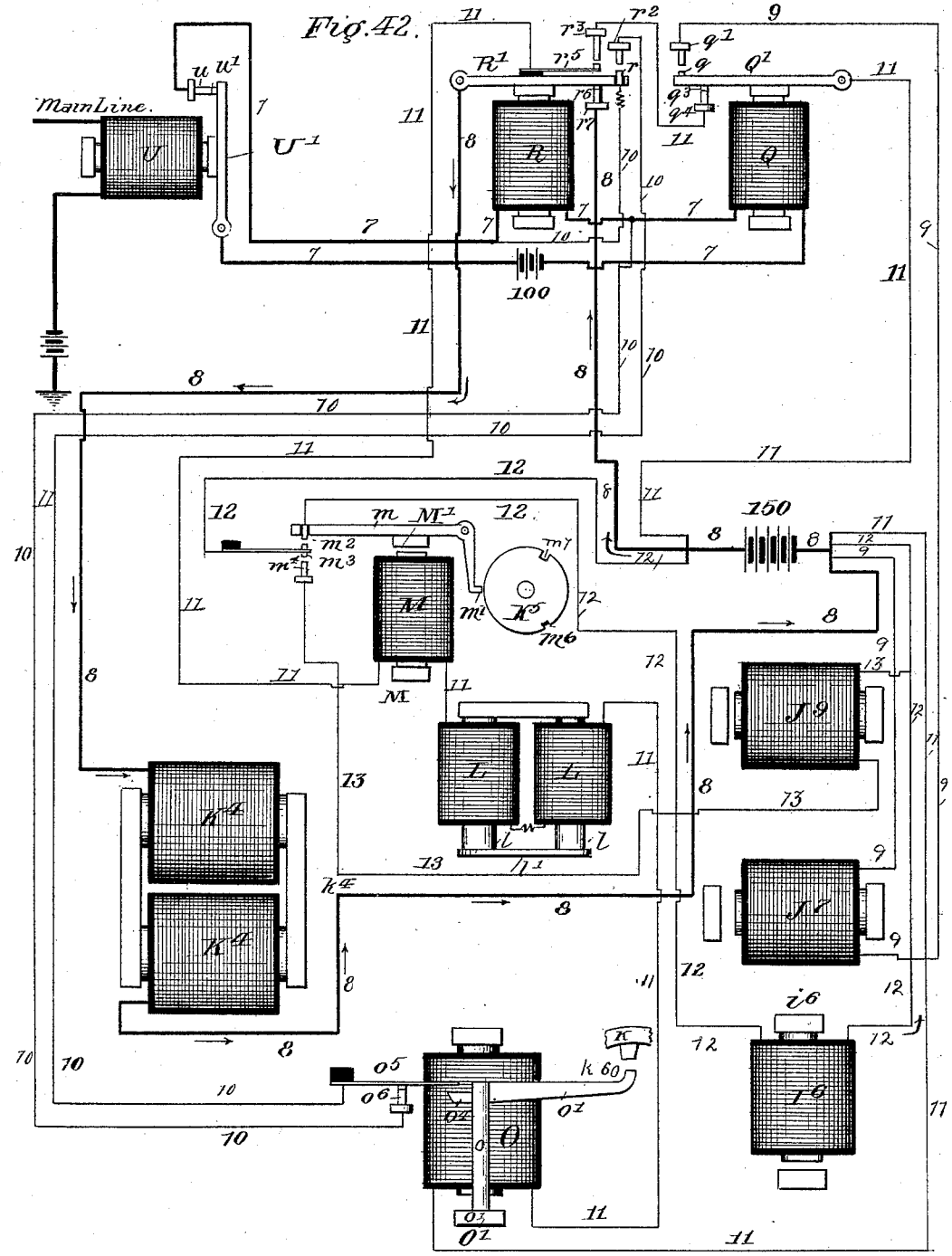
Figure 43:
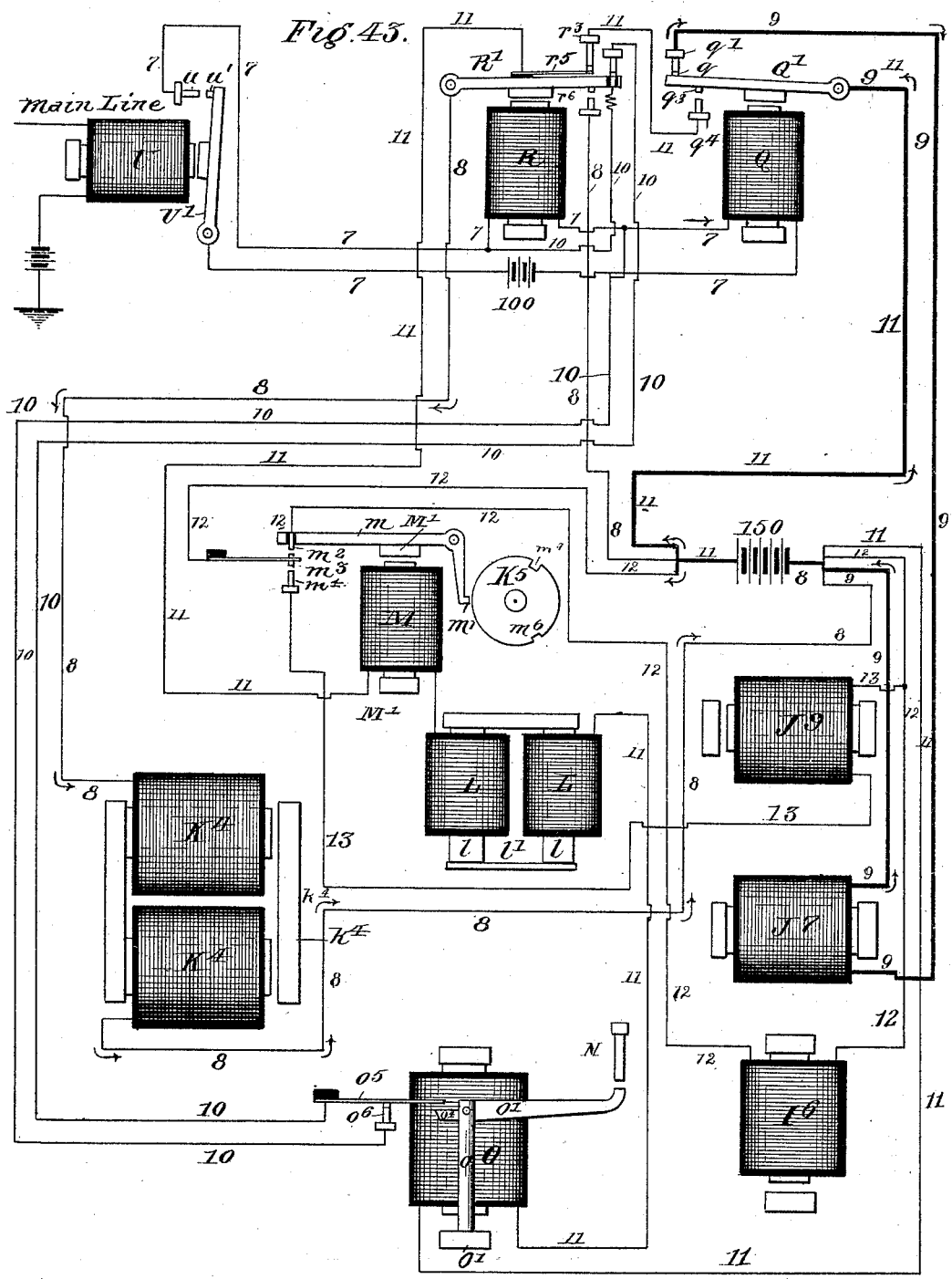
Figure 44:
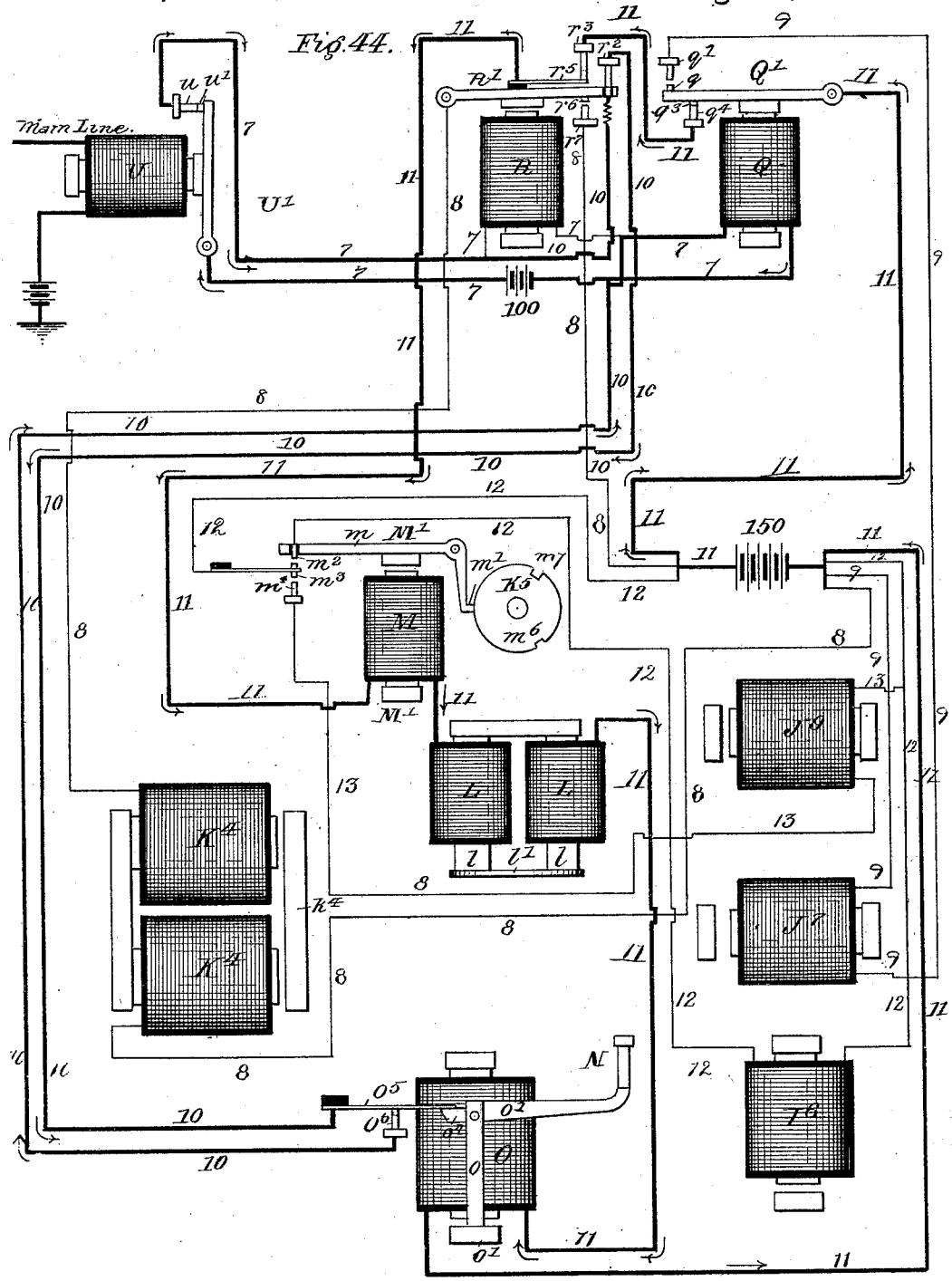

In the accompanying drawings, which illustrate a desirable form of construction and operative arrangement of my invention, Figure 1 is a top plan view of the transmitter, in part broken away. Fig 2 is a bottom plan view of the transmitter generally, illustrating the arrangement of the operative mechanism thereof. Fig. 3 is a vertical section of the transmitter, taken substantially through its center. Fig. 4 is a broken detail of a plate, preferably semicircular, forming part of the transmitter, which carries a series of circuit closing and opening devices which are operated by the key-levers, and a series of adjustable contact members. Fig. 5 is a detail perspective view showing said circuit opening and closing device carried by said semicircular plate. Fig. 6 is a detail illustrating the construction and arrangement of the key-rod and insulating-button, which I employ in conjunction with the key-lever. Fig. 7 is a broken detail illustrating the preferred form given to the end of the circuit-breaking arm which comes in contact with the rod, forming part of the circuit making and opening devices operated by the key-levers. Fig. 8 is a detail illustrating the operative arrangement of the devices forming part of the transmitter, which are employed for indicating the traversing action and position of the paper-carrying devices of the receiving-instrument, said devices being viewed in the direction indicated by the transversely-drawn arrow shown in Fig. 1. Fig. 9 is a bottom plan detail of said indicating devices shown in said Fig. 8. Fig. 10 is a detail intended to further illustrate said next above-described devices. Fig. 11 is a top plan view of the receiving-instrument. Fig. 12 is a bottom plan view of the receiving-instrument. Fig. 13 is an elevation of the receiving-instrument, looking in the direction of the transversely-drawn arrow shown in Fig. 11. Fig. 14 is a detail particularly intended to illustrate the arrangement of the inking-ribbon with reference to the printing-wheel. Fig. 15 is a detail particularly illustrating in elevation the carriage-retracting mechanism of the receiving-instrument, as seen in the direction indicated by the transversely-drawn arrow shown in Fig. 12. Fig. 16 is a detail, partly in section, particularly intended to illustrate the construction of the carriage-traversing mechanism of the receiving-instrument, as viewed in the direction indicated by the said transversely-drawn arrow shown in said Fig. 12. Fig. 17 is a detail, partly in section, illustrating the devices employed for rotatively operating the paper-roller carried by the carriage of the receiving-instrument, the said devices being viewed from the direction indicated by the transversely-drawn arrow adjacent to said devices shown in Fig. 11. Fig. 18 is likewise a detail of the paper-roller-rotating devices, said figure being taken upon the line X X, of said Fig. 17, and being viewed in the direction indicated by the arrow therein shown. Figs. 19 and 20 are details further illustrative of the said paper-roller-rotating mechanism. Fig. 21 is a detail showing the devices employed for effecting vertical adjustment of the paper-roller. Figs. 22 and 23 are end and side details, respectively, partly in section, illustrating certain other devices employed for effecting vertical adjustment of the paper-roller. Fig. 24 is an enlarged detail, particularly illustrating the printing mechanisms as the same would be in position for effecting the printing operation, said view being taken mainly in vertical section transverse the printing-receiver, substantially on the line Y Y of Fig. 11, looking in the direction indicated by the longitudinally-drawn arrow therein shown. Fig. 25 is an enlarged side detail, in part broken away, showing the construction and arrangement of the printing-wheel. Fig. 26 is an enlarged top plan detail illustrating substantially in central horizontal section the construction of the printing-wheel and in full lines the brake devices employed in conjunction therewith, the view being in the direction indicated by the vertically-drawn arrow shown in Fig. 24. Fig. 27 is a detail showing the construction of the type carried by the printing-wheel. Fig. 28 is an enlarged detail, mainly in vertical section, taken similarly to Fig. 24, on the line Y Y of Fig. 11 and looking in the same direction, the said view being intended to illustrate the position of the printing devices in the actual operation of printing. Fig. 29 is an enlarged side detail particularly intended to illustrate devices employed for actuating, retracting, and normally holding the printing-wheel. Fig. 29$^a$ is a detail view of the printing-wheel speed-regulating stem and the indicator-pointer carried thereby. Figs. 30, 31, and 32 are details illustrating certain of the devices which relate to the retraction and rotation feed of the paper-roller. Figs. 33 and 34 are details further illustrating the devices employed for longitudinally feeding and retracting the paper-roller, said view also showing certain of the devices which carry and operate the inking-ribbon. Fig. 35 is a detail of the inking-ribbon feeding devices, taken upon the line X X of said Fig. 33, looking in the direction of the transversely-drawn arrow therein shown. Fig. 36 is a detail showing the gear-flange of the ribbon-roller P$^2$ and the ratchet-wheel $p^5$ carried thereby. Fig. 37 is an elevation of the relay which I employ for operating the circuits of the receiving-instruments. Fig. 38 is a top plan view of said relay. Fig. 39 is a detail, partly in vertical section, taken upon the line X X of said Fig. 37 and looking in the direction of the horizontal arrow therein shown. Fig. 40 is a detail view showing the armature-lever of the relay R. Fig. 41 is a diagrammatic view illustrative of the circuits of the transmitter and the transmitter end of the main-line circuit. Fig. 42 is a diagrammatic view of the circuits of the receiving-instrument and receiving-instrument end of the main-line circuit, the heavy lines indicating circuits which are closed when the transmitting and receiving instruments of the system are in their normal positions. Fig. 43 is a diagrammatic view of the circuits of the receiving-instrument, the heavy lines indicating the circuit, which is closed by the opening of the main line for the purpose of longitudinally moving the paper-roller one space, said view also illustrating the circuit of the magnet $K^4$, which normally holds the type-wheel in its normal position, as being opened, enabling the type-wheel to be carried to printing position. Fig. 44 is a diagrammatic view of the circuits of the receiving-instrument and the receiving-instrument end of the main-line circuit after the main line is closed, the heavy lines indicating the local circuits which are closed for the purpose of effecting operation of the brake-magnet and printing-magnet and shunting the local relay R to prevent action thereof until the printing-magnet has operated upon the type. Fig. 45 is a diagrammatic view of the circuits of the receiving-instrument and the receiving-instrument's end of the main-line circuit, the heavy lines indicating as closed the circuit through the magnets $I^6$, which effect the rotative feed of the paper-roller. Fig. 46 is a diagrammatic view of the circuits of the receiving-instrument and the receiving-instrument's end of the main-line circuit, the heavy lines indicating the circuits which are closed for the purpose of actuating the devices which rotatively feed and retract the paper-roller.

Referring by letter to the several figures of the drawings, like letters denote like parts.

*The transmitter.*—A is the main frame or base of the transmitter, which is provided with bearings suitable for its various operative parts. A' is a semicircular plate fixed to said base, which carries a suitable number of adjustable contact members $a$.

$A^2$ is a guide-bracket fixed to the under side of the base A in position corresponding with the location of and in vertical alignment with the semicircular plate A'.

$a'$ indicates perpendicularly-movable rods, which work through the plate A' and bracket $A^2$, each carrying a plate $a^2$, to which is fixed a contact-point $a^5$.

$a^3$ is a parallel guide-rod fixed to the plate $a^2$, which, working through the bracket $A^2$, holds the contact-point $a^2$ in alignment with its corresponding contact member $a$.

$a^4$ is a coil-spring surrounding the rod $a'$, exerting a constant perpendicular or upward tensional strain thereon.

$a^6$ is a metallic sleeve or conducting-bushing surrounding the contact member $a$, and $a^7$ is a non-conducting bushing which surrounds said sleeve $a^6$, insulating the same from the plate A'.

B indicates a series of finger-keys, which represent a corresponding series of characters employed in the type-wheel of the receiving-instrument, each of which is provided with an insulated button $b$, which is fixed to a perpendicular stem $b'$, pivotally connected with a horizontally-inclined lever $b^2$, which fulcrums upon a bearing-rod B', fixed to the base A. The opposite end of each key-lever $b^2$ bears upon a plate $a^2$, carried by a rod $a'$, and by reason of the upward tensional strain exerted by a spring $b^3$, which surrounds the key-stem $b'$, normally exerts a downward tensional strain upon the rod $a'$ sufficient to overcome the upward tensional strain of a spring $a^4$ carried thereby, and to normally hold said rod and the contact-point $a^5$ carried thereby in the position particularly shown in Figs. 3 and 41.

$B^2$ $B^3$ are stops fixed to the base-plate A for determining the length of movement of the key-levers $b^2$, the stop $B^2$ being insulated from the base A and forming a contact, through which a circuit is closed when the lever-arm engages therewith.

C indicates an axially-movable spindle, which journals near its upper termination in the base A, its lower end being held by a bracket C', fixed to said base. The upper termination of said spindle is provided with a radially-projecting circuit-breaking arm $C^2$, and at a suitable point below said arm with a pinion $c$ and a circular plate-armature $c'$, both of which are keyed or otherwise rigidly fixed thereto.

$C^3$ is a coil-spring fixed by one of its ends to the spindle C, and by its other end to an axially-movable adjusting-stem $C^4$.

$c^3$ is a set-screw employed for securing the said stem against axial movement.

$C^5$ is an indicator-arm attached to the stem $C^4$, and $C^6$ is an index-plate carried by the base-plate A, employed co-operatively with said arm. Laterally of said spindle C, and sustained by the bracket C', are located electro-magnets D, hereinafter referred to as "brake-magnets," the cores $d$ of which are in snug working proximity to the under face of said armature $c'$.

E is an arm pivotally held to a standard E', fixed to the base-plate A, and provided with a segmental rack $e$, which meshes with and operates the pinion $c$, fixed to the spindle C.

F are electro-magnets, hereinafter referred to as "circuit-breaking-arm magnets," held fixedly to the plate A, their armature $f$ having operative connection with the segmental rack-arm by means of the rod $f'$ and link $f^2$.

G is an indicator-arm projecting over the face of the base-plate A toward a segmental index-plate G', being secured to an axially-movable perpendicular spindle $G^2$, which carries a ratchet-wheel $G^3$ and a vibratory arm $G^4$, which forms an armature $g$ at or near its extremity for the electro-magnets $G^5$, hereinafter referred to as "roller-indicator magnets," which are held to the base-plate A. (See Fig. 8, 9, and 10.) Said arm $G^4$ also carries a pawl $g^3$ and a spring $g^4$, which exerts a constant tension on said pawl.

$G^7$ is a spring coiled around and fixed by one of its ends to the spindle $G^2$, being fixed by its other end to a suitable standard E'.

$G^6$ is a pivoted lever forming a detent operated by a finger-key, (designated as $B^{10}$, see Figs. 1, 2, 8, 9, and 10,) which holds and releases the ratchet-wheel $G^3$ in the manner and for the purposes hereinafter particularly described.

$B^{10}$, $B^{30}$, and $B^{40}$ are finger-keys which are employed for operating certain of the devices hereinafter set forth.

*Receiving instrument.*—H is the base-plate of the receiver. H' designates brackets fixed thereto, which sustain a rotatable horizontal bar I, upon which works a horizontally-movable paper-roller I'. J is a carriage operatively connected with said roller and longitudinally movable therewith. The said standards H' (see Fig. 21) are provided each with an adjustable block $h$, which forms an end bearing for the bar I, said block being vertically operative and held in position by means of an adjustable screw $h'$ and securing-screws $h^2$. The carriage J is composed, desirably, of head and tail pieces $j^4$ and parallel spacing-rods $j^5$, which carry paper-guides $j^6 j^7$, the guide $j^6$ being movably held to its rod $j^5$ by means of a split sleeve $j^{30}$, formed integrally thereof or to which it is fixed, and a set-screw $j^8$. The head and tail pieces $j^4$ of the carriage are provided each with an opening $j^{23}$, desirably rectangular in form, within which works the sliding block $j^{20}$, provided with a cylindrical opening which corresponds diametrically with and receives the cylindrical hub $j^{24}$ of the roller I'. The sliding block $j^{20}$ is operatively held in position within its opening $j^{23}$ by means, preferably, of an integral flange $j^{21}$ (see Fig. 23) and a cap-plate $j^{22}$, which bears against the inner and outer faces of the piece $j^4$, and which are secured together by screws, as shown, or in any other desired manner. By the perpendicular adjustment of the block $h$ of the standard H', effecting adjustment of the bar I, and therefore of the roller I' in a direction toward or from the base H and the perimeter of the printing-wheel K, the carriage is enabled, through the compensating movement of the blocks $j^{20}$, to maintain its regular and proper working position, bearing upon the base H, undue friction, liable to ensue from direct contact of the carriage with said base, being obviated by the employment therewith of friction-wheels $j^{25}$. J' is a rack carried by said carriage, which meshes with a gear-wheel $J^2$, rigidly held to a shaft $J^3$, sustained by bearing-brackets Z Z', fixed to the under side of the base H, the said base being suitably slotted so as to enable working engagement of said gear-wheel with said rack.

$j^{26}$ is an angle-plate fixed to the base H, projecting transversely over the rack J', the office of said plate being to hold said rack to working engagement with the gear $J^2$. The said shaft $J^3$ also carries a fixed ratchet-wheel $J^4$, a loose disk $J^5$, provided with a click $j$, which engages with the teeth of said wheel $J^4$, a click-operating spring $j'$, and a pinion $J^6$, Figs. 33 and 35.

$J^7$ are electro-magnets, hereinafter referred to as "roller-traversing magnets," the armature $j^7$ of which carries a stem $j^2$, which is pivotally connected at at $j^{27}$ to the loose disk $J^5$, its free end being provided with a foot $j^3$, which engages with the teeth of the gear-wheel $J^2$.

$j^{28}$ is a spiral spring located upon the stem $j^2$, which exerts a constant tensional strain upon the armature $j^7$ in a direction from the cores of its magnets $J^7$. (See Figs. 15 and 16.)

$J^9$ are electro-magnets, hereinafter referred to as "roller-retracting magnets," the armature $j^9$ of which carries a stem $j^{10}$, which is connected with and operates an arm $j^{11}$, rigidly connected with a shaft $j^{12}$, sustained by the bracket Z' and carrying a detent $j^{13}$, which engages with the teeth of the ratchet-wheel $J^4$.

$j^{14}$ is a leaf-spring fixed to the arm $j^{11}$, which is connected with the shaft $j^{12}$, said spring bearing upon the armature guide-pin $j^{15}$ of the lower one of the electro-magnets $J^9$ (see Fig. 15) and exerting when the armature $j^9$ is away from its magnets $J^9$ a constant tensional strain upon the detent $j^{13}$ in the direction of its engagement with the ratchet-wheel $J^4$.

$j^{29}$ is a spiral spring located around the armature-stem $j^{10}$, which is intended to exert a constant strain upon the armature $j^9$ in a direction from its magnets $J^9$.

$J^8$ is a coil-spring fixed by one end to the shaft $J^3$, around which it winds, and by its other end to the under side of the base H.

$I^2$ is a gear-wheel fixed to the roller-bar I, (see Figs. 13, 15, 16, 17, 18, and 20,) and $I^3$ is a ratchet-wheel likewise fixed thereto. $I^4$ is a disk provided with a segmental gear $i^4$, held movably to the said bar I, adjacent to the ratchet-wheel $I^3$. The said disk is provided on its lateral face with a pawl $i$ and a pawl-operating spring $i'$, and engages by its gear $i^4$ with a rack $i^5$, provided on the stem $I^5$ of the armature $i^6$ to the electro-magnets $I^6$, hereinafter referred to as "roller-rotating magnets." The stem $I^5$ is provided with a projecting foot $i^7$, which operates as a check to the rotating movement of the gear $I^2$, when actuated by the pawl and ratchet $i$ $I^3$. The said stem $I^5$ is provided with a spiral spring $i^8$, which bears against the base H and the armature $i^6$, exerting a constant downward strain on the said armature.

$i^{15}$ are armature guide-pins projecting from the cores of the magnets $I^6$.

K indicates the type-wheel, which is fixedly carried by an axially-movable shaft $k$, sustained beneath the base-plate H by bearing-brackets $k'$ $k^3$. Said shaft $k$ also carries adjacent the type-wheel a pinion $K'$, which is engaged by a segmental rack $k^2$, Fig. 29, formed integrally of or fixedly connected with an arm $K^2$, pivotally held to a bearing $k^{10}$, carrying the armature $k^4$ of the electro-magnets $K^4$, hereinafter referred to as "type-wheel magnets." The said shaft $k$ also carries an armature-governor $K^5$, provided on its perimeter with radial recesses $m^6$ $m^7$, Figs. 30, 31, and 32, which differ in depth, and in which works, for the purposes hereinafter set forth, a pawl $m'$, which is fixed to or forms part of a pivoted lever $m$, which carries the armature $M'$ of the electro-magnets M, hereinafter referred to as "circuit-closing magnets." (See Figs. 30, 31, and 32.) The outer end of said lever $m$ is provided with an insulated contact-point $m^2$, adapted to make electrical connection, through the adjacent spring-contact $m^3$ and the wire 12 and the fixed contact-point $m^4$ and wire 13, with the roller-rotating magnets $I^6$ and the roller-retracting magnets $J^9$, respectively. The said shaft $k$ also carries an actuating-spring $K^7$, which winds thereon, (see Figs. 13 and 29,) and which is connected by its outer end with a tension-regulating device, preferably in the form of a shaft $k^7$, which carries a worm-wheel $k^8$, operated by a worm $k^9$, forming part of or carried by a stem $k^{11}$, which also carries above the upper plane of the base H an indicator-pointer $k^{12}$, operatively employed in conjunction with an index-plate $k^{13}$, located adjacent thereto upon said base-plate.

The type-wheel K is provided on one of its lateral faces with a disk-like plate-armature $l'$, axially movable therewith, which may be fixed to the shaft, if desired, independently of said wheel. Adjacent to said armature are located electro-magnets L, hereinafter referred to as "type-wheel brake-magnets," the cores $l$ of which are in immediate working contiguity, or thereabouts, with said armature. The said type-wheel is composed desirably of a main portion $k^{14}$, (see Figs. 25 and 26,) which is provided with radial slots $k^{16}$, in which the types N work, and an annular plate $k^{17}$, which is fastened to said portion $k^{14}$, preferably in the manner shown in Figs. 25 and 26, the said plate being provided with a laterally-projecting annular ring $k^{18}$, which enters a recess provided in the types and determines the length of their radial travel. The types N are retracted from their outer or printing position and held normally at the limit of their inward travel by U-shaped springs $k^{20}$, which, being fixed by one end to or about the portion $k^{14}$ of the wheel K, pass through suitable openings $k^{19}$, formed in the said portion $k^{14}$, to connection with the type by means, preferably, of an opening $k^{21}$, provided therein.

The types N are composed of a main or base-portion $N'$, formed of hard metal, as of steel, and a portion $N^2$, which carries the printing character, formed of type-metal, said parts being desirably soldered together. The purpose of thus constructing the type is to insure its capacity for withstanding the stroke of the device which drives them in their printing operation, and to avoid expense such as would be incurred if they were made entirely of hard metal.

The devices employed for effecting printing operation of the type-wheel are as follows: The armature $O'$ of electro-magnets O, hereinafter referred to as "printing-magnets," is provided with a stem $o$, which carries an arm $o'$, which projects laterally to a point immediately in alignment with and closely adjacent to the lower end of the type N, when the same are at the limit of their inward travel. The said stem carries a spiral spring $o^2$, which exerts a constant downward strain upon the armature $O'$, holding the same normally from the magnets O and the arm $o'$ from the type, as particularly shown in Fig. 24, the position which the armature normally occupies being determined, as a matter of preference, by a check-screw $o^3$, held by an extension of the bearing-bracket $k^3$, which sustains the type-wheel shaft $k$. The stem $o$ also carries a lateral projection $o^4$, which engages when said stem is moved upwardly with a movable contact $o^5$ and removes the same from the fixed contact-point $o^6$. The type-wheel K is also provided at suitable points within the circle described by the lower ends of the types N with lugs $k^{50}$, $k^{60}$, and $k^{70}$, as is hereinafter fully described, which are brought each, as occasion may require, in alignment with the striking end of the arm $o'$, obstructing its upward movement, and thereby preventing the removal of the contact-point $o^5$ from the fixed contact-point $o^6$, engagement of said points $o^5$ and $o^6$ normally closing a shunt-circuit, hereinafter more fully described. The inking-ribbon P, (see Fig. 14,) carried by the rolls $P'$ and $P^2$, passes from said roll $P'$, from which it is intermittingly fed co-operatively with the operation of the type-wheel, horizontally to and over a roll $p$, thence upwardly through a slot provided in the base H to and over a roll $p'$ and horizontally over the perimeter of the printing-wheel $k$, and beneath the paper-roller $I'$ to and over a roll $p^2$ and thence downwardly to the roll $P^2$. The said roller $P^2$, fixedly held to a shaft $p^3$, sustained by brackets Z and $Z^3$, held to the base-plate H, carries a pawl $p^6$, (see Fig. 35,) which engages with a ratchet-wheel $p^5$, fixedly carried by a spur-gear $p^4$, working loosely upon said shaft $p^3$, which is engaged and operated by the pinion $J^6$, fixed to the shaft $J^3$, which carries the gear $J^2$, which traverses the roller-carriage J. As the said carriage J is fed forward, the spur-gear $p^4$ is driven by the pinion $J^6$ in the direction indicated by the curved arrows shown in Fig. 35, the pawl $p^6$, held to engagement by its spring $p^7$ with the ratchet-wheel $p^5$, causing said roller $P^2$ to be driven in the same direction and to gradually wind thereon the ribbon P. A reverse action of the pinion $J^6$, which takes place in the retracting operation of the paper-roller, carries the ratchet-wheel in a direction from operative engagement with the pawl $p^6$, the roller $P^2$ being held during such reverse movement by the spring $p^8$, which engages with a serrated or geared perimeter $p^9$ of one of the flanges of said roll, and thus preventing the ribbon from being unwound.

The insulating-button $b$, forming part of the transmitter-key, (particularly shown in Fig. 6,) is composed of a non-conducting base $b^4$, preferably of hard rubber, which is fixed to the upper end of the stem $b'$, a metallic inclosing-cap $b^5$, desirably held to said base $b^4$ by a screw-thread, as shown, and provided with an inwardly-projecting flange $b^6$, and a mica plate $b^8$, which forms a transparent covering for the character-plate $b^7$, carried by the upper face of said base $b^4$, the said plates $b^7$ $b^8$ being held in position by the flange $b^6$ when the parts $b^4$ and $b^5$ are fixed together.

*The relays of the transmitter.*—The transmitter is preferably provided with local relays V, V', and $V^2$, (shown in Fig. 41,) each of which is of the ordinary construction. The relay V is used exclusively for opening and closing the main-line circuit. The relays V' $V^2$ are used to open and close certain circuits of the transmitter, as hereinafter fully set forth in the description of operation.

*The relays of the receiver.*—The relay Q (shown in Figs. 37 and 38) is of the ordinary construction. The relay R (shown in Figs. 37, 38, 39, and 40) is particularly arranged and adapted for circuit-shunting purposes, and for prolonging the period of time after the said relay is energized, within which a circuit or circuits shall be held closed, as is hereinafter fully set forth in the description of operation. Its construction is as follows: The armature R' is provided with circuit-closing points $r$ $r^6$ and a non-conducting point $r^4$, which is desirably capable of perpendicular adjustment. The frame $R^2$, within which said armature vibrates, is provided with fixed contact-points $r^2$ $r^7$, a movable contact $r^5$, and a contact-point $r^3$, which is desirably capable of perpendicular adjustment.

The respective offices of the said contact devices are as follows: When the relay is energized, the point $r^6$ of the armature makes contact with the point $r^7$ of the frame, closing a circuit, hereinafter described, and the non-conducting point $r^4$ holds the contact $r^5$ from the point $r^3$. When the relay is de-energized, the upward movement of the armature is followed by the movable contact $r^5$ until the point $r^3$ is reached and a circuit, hereinafter described, closed thereby, the armature thereafter continuing to move upwardly through the limit of its stroke, which is determined by its point $r$ making contact with the point $r^2$ of the frame, which closes a circuit, hereinafter described, the non-conducting point $r^4$ obviously moving away from the contact $r^5$ as the same connects with the point $r^3$. As the relay is energized, the armature moves through a certain portion of its downward travel before reaching and removing the contact-point $r^5$ from contact with the point $r^3$, thus allowing the circuit closed by said contacts $r^5$ and $r^3$ to remain closed for a certain period of time after the closing of the circuit which energizes the relay.

*The circuits.*—The circuits of the system are deemed to be sufficiently set forth in the description of operation. Operation: Upon depressing one of the transmitter-keys B by its button $b$ the free end of the key-arm $b^2$ is raised from the plate $a^2$, allowing the rod $a'$ to move perpendicularly to the limit of its upward travel, and said point $a^5$ to make contact with a contact member $a$, carried by the semicircular plate A', and closes local circuits, passing through the relay-magnets V V' over the wires 2, 4, and 3, as indicated by the arrows in Fig. 41, drawing the armature $v$ toward its magnet V, and thereby drawing the contact $w$ from the contact-point $w'$ of the relay V, opening the main-line circuit. At the same time the armature $v'$ being drawn toward its magnet draws the point $x$ from the point $x'$, opening over the wires 1 the circuit of the circuit-breaking-arm magnets F, which circuit is held normally closed. As the key-arm reaches in its upward movement the stop-contact $B^2$, fixed to the base-plate A, it closes a circuit formed by the wires 2, the key-arm fulcrum B', the key-arm $b^2$, the stop-contact $B^2$, and wires 3, through the relay-magnets $V^2$ to the battery 100, drawing the armature-point $y$ away from the point $y'$, and further opening through the wires 1 the circuit of the circuit-breaking-arm magnets F, which circuit remains open at the point $y'$ so long as said key-arm remains in engagement with the stop-contact $B^2$. Upon de-energization of the circuit-breaking-arm magnets F by the opening of the circuit 1 the armature $f$ is released from its magnets, the spring $C^3$, fixed to the circuit-breaking-arm spindle C, and the stem $C^4$, moves the said spindle on its axis, and the arm $C^2$, carried by said spindle, starts to move over said semicircular plate A', as indicated by the curved arrow shown in Fig. 1. As the main line is opened, the armature U' of the main-line relay of the receiver breaks contact by its point $u'$ with the point $u$, (see Fig. 43 in connection with Fig. 41,) opening the local relay-circuit, described by way of wires 7 through the magnets R and Q, which circuit is normally closed, as shown in Fig. 42 by heavy lines, the armature R' of the magnets R breaking contact by its point $r^6$ with the point $r^7$, opening the circuit of the type-wheel magnets $K^4$ of the receiver by way of wires 8, which circuit is normally closed, as shown by heavy lines in Fig. 42. As the type-wheel magnets $K^4$ are de energized through the opening of the circuit 8, the armature $k^4$ is released, and the spring $K^7$, which is fixed to the type-wheel shaft $k$ and stem $k'$, (see Figs. 13 and 29,) being free to act, turns the type-wheel upon its axis by its said shaft. Simultaneously the armature Q' of the relay-magnets Q, making contact by its point $q$ with the point $q'$, closes the circuit of the roller-traversing magnets J$^7$ by way of wires 9. (Shown in heavy lines in Fig. 43.) During the travel of the circuit-breaking arm over the semicircular plate A', and until the end of this arm, which is desirably tapered, as shown in Fig. 7, contacts with the raised rod $a'$, not only are the magnets V and V' energized, but the magnet V$^2$ is also energized, thereby holding its armatures $v^2$ depressed against the contact-point $y^2$. Up to this time, however, there has been no energization of the brake magnet D, as this magnet is in the circuit 5, which cannot be closed until the magnet V' is de-energized to permit the points $x$ and $x'$ to contact, and thereby complete the circuit 5, through the armatures $v^2$ and $v'$ and line 1 to battery. As the operator holds the key depressed during this forward movement of the circuit-breaking arm C$^2$, it is plain that as soon as the end of this arm depresses the rod $a'$ and causes a separation of the contact-points $a$ and $a^5$ the opening of the circuits 2 and 4, and consequent de-energization of the magnets V and V', will occur, thereby permitting the points $x$ and $x'$ to contact and complete the circuit 5 through armatures $v^2$ and $v'$ and wire 1 to battery. This completion of the circuit 5 effects the energization of the brake-magnet D, causing this magnet to attract the armature-plate $c'$, and consequently to arrest the movement of the circuit-breaking arm and hold such arm in fixed position so long as the key-lever $b^2$ remains in contact with the stop-contact B$^2$. When, however, the operator releases the key B, thereby permitting the lever-arm $b^2$ to drop away from the stop-contact B$^2$, the local circuit 3, through relay V$^2$, is broken, and the armature $v^2$ is released, so as to permit the points $y$ and $y'$ to contact, thereby closing the circuit 1, through the circuit-breaking-arm magnets F, for the purpose of energizing said magnets and causing the rack-bar connected with their armature to restore the circuit-breaking arm to its normal position, as will hereinafter more fully appear. As the main-line relay-armature U' of the receiver closes, following the closing of the main-line circuit at $w$ $w'$, through the engagement of the circuit-breaking arm C$^2$ with the perpendicular arm $a'$, it closes a local circuit through the magnet Q of the local relay by way of the wires 7 and 10, as shown by the heavy lines in Fig. 44, drawing the armature contact-point $q^3$ to the point $q^4$ and closing a circuit, which, passing through the circuit-closing magnets M, brake-magnets L, and printing-magnets O, by way of wires 11, operates the armatures M', $l'$, and O'. As the magnets L are energized, axial motion of the disk-like armature $l'$, fixed to the type-wheel shaft $k$, is checked thereby, the type-wheel K, also fixed to said shaft, being likewise arrested and rigidly held. Simultaneous with the stopping of the type-wheel K the armature O' is drawn toward its magnets O, (see Fig. 28,) causing the printing-arm $o'$ to strike against the lower end of the type N, effecting the recording upon the paper carried by the roller I' of the character carried by said type, which character corresponds with the character represented by the transmitter-key which brought about the action described. As the circuit-closing magnets M are energized, their armature M' is drawn thereto, carrying its arm $m'$ against the perimeter of the notched governor K$^5$, carried by the type-wheel shaft $k$, the contact-point end of the arm $m$ occupying a position shown particularly in Figs. 30 and 44, preventing when in such position the closing through the points $m^2$ $m^3$ of certain circuits hereinafter referred to. As the arm $o'$ through its upward movement effects printing operation of the type N, (see Fig. 28,) the projection $o^4$, carried by the armature-stem $o$, engages with the flexible contact $o^5$, removing the same from the contact-point $o^6$, and thereby opening the shunt-circuit 10, (see Fig. 44,) allowing the current to pass into the local relay R by way of the wires 7, the local-relay armature R' being drawn to its magnets and opening at the points $r^3$ $r^5$ the circuit of the circuit-closing magnets M, the brake-magnets L, and the printing-magnets O, the armatures of which are thereupon freed, allowing the armatures of the magnets M and O to return to their normal position. As the armature-point $r^6$ of the local relay R makes contact by its downward movement with the contact-point $r^7$, it closes circuit 8 through the type-wheel magnets K$^4$, causing the armature $k^4$ to be drawn to said magnets, and thereby operates the pinion K' by means of the rack forming part of the pivoted rack-arm K$^2$, drawing the type-wheel K back to its normal position, (see Fig. 29,) the actuating-spring K$^7$ being rewound upon the shaft $k$ through such movement. As the armature R' of the local relay R moves downwardly, it opens the points $r$ $r^2$, the shunt-circuit through the wires 10 preventing the relay R from again being shunted until the main-line relay U is again opened. As the depressing strain upon the key B of the transmitter is released and the key-arm $b^2$ allowed to pass from its contact with the stop-contact B$^2$, it opens the circuit of the relay V$^2$ by way of the wires 2 and 3, the armature $v^2$ opening at the points $y$ $y^2$, the circuit of the brake-magnets D through wires 5 and 1, freeing the armature $c'$, carried by the circuit-breaking-arm spindle C. As said armature $v^2$ on its upward movement makes contact by its point $y$ with the point $y'$, it closes the circuit of the circuit-breaking-arm magnets F by way of the wires 1, causing said armature to be drawn to its magnets F, and thereby, through the segmental rack $e$ of the arm E, to move by the pinion $c$, fixed to the spindle C, the circuit-breaking arm C² back to its normal position, rewinding the actuating-spring C³ upon the said spindle C.

While in the foregoing description the operation of the transmitter has been set forth as said operation occurs when one of the finger-keys has been depressed it is obvious that the operation will be essentially the same when the other finger-keys are depressed, with this difference, however, that while the depression of each key serves in like manner to reverse the normal condition of the main-line circuit—as, for example, by opening the circuit if it be a normally-closed circuit, as is the case with the construction herein set forth—the various keys serve to restore the normal condition of the main-line circuit at the ends of different periods of time after such normal condition of the main-line circuit has been reversed. For example, if the three keys B, corresponding to the letters $h\ a\ t$, were successively depressed it would be found that while the depression of these keys would in like manner set in operation the mechanism that serves to effect the opening and closing of the main-line circuit, still the time that supervened between the opening and the closing of such circuit as effected by the key corresponding to the letter $h$ would be different from the times that supervene between the opening and closing of the main-line circuit as effected by the keys corresponding to the letters $a$ and $t$. In the form of my invention illustrated in the drawings this difference in the periods of time during which the normal condition of the main-line circuit is reversed is due to the relative arrangement of the rods $a'$ with respect to the path of travel of the circuit-breaking arm C, whereby this arm is allowed to move different distances from its starting-point or normal position before it is arrested, consequently permitting the main-line circuit to remain open for different periods of time corresponding to the different letters or characters of the transmitter. The key-levers attached to the various keys and their appropriate connections, as above described, afford the means for determining the passage of current through the local circuit, in which these levers are interposed, while the circuit-breaking arm serves to control the passage of current through said local circuit, as herein fully set forth. Plainly, therefore, the stops $a'$, arranged as they are at different distances from the starting-point or normal position of the circuit-breaking arm, form with this arm and with the connections hereinbefore set forth one form of differential mechanism (although I do not wish my invention to be understood as restricted thereto) for restoring the normal condition of the main-line circuit after such normal condition has been reversed.

*Horizontal feed of paper-roller carriage.*—Upon depressing a key B of the transmitter, which action closes through the contact-points $a^5$ and $a$ the circuit of the local-relay magnets V V', opening the main line at the points $w\ w'$ of the local relay V, the armature of the main-line relay U of the receiver opens at the points $u\ u'$ the local circuit (see Fig. 43) of local relays R and Q, the armature of the relay Q closing on its upward movement through the contact-points $q\ q'$ and wires 9 and 11 the circuit of the roller-traversing magnets J⁷, as shown by heavy lines in Fig. 43, the armature $j^7$ being drawn to its magnet (see Figs. 16 and 34) and by its stem $j^2$ moving the vibratory disk J⁵, carried by the shaft J³, to which said stem is pivoted, and thereby driving by the click $j$ the ratchet-wheel J⁴, which is fixed to said shaft forward the length of a tooth, which movement also carries the gear-wheel J², which is likewise fixed to the shaft J³ forward the length of one of its teeth, the rack J', forming part of the roller-carriage J, which is engaged by said gear, being also fed forward by the travel of said gear, the spring J⁸, attached to the shaft J³, being gradually wound thereon as the said carriage is fed forward. As the click $j$ drives the ratchet-wheel J⁴ ahead, the foot $j^3$, formed at the outer end of the stem $j^2$, drops between the teeth of the gear-wheel J² and prevents the same from traveling beyond the distance intended for it to be driven by the click, the armature $j^7$ remaining in position against its magnet until the main-line relay U by the points $u\ u'$ closes the local circuit of the local relay Q, thereby opening at the points $q\ q'$ the circuit of the magnet J⁷, which action is brought about as the arm C² of the transmitter engages with the rod $a'$, opening the local circuit 2 through the magnet V, allowing the armature of said magnet to close the main line at the points $w\ w'$. As the said circuit of the magnet J⁷ is opened, the armature $j^7$ returns to its normal position, the disk J⁵ on its return-stroke carrying the click by one of its ends against the projecting portion of the bracket Z', (see Fig. 15,) withdrawing its driving end from the teeth of the ratchet-wheel and holding it beyond the possibility of engagement therewith until the disk J⁵ shall be again carried ahead through the action of the armature $j^7$. The foot $j^3$ being likewise removed from engagement with the gear J², the pawl $j^{13}$, which engages with said ratchet-wheel, operates as a detent to prevent backward travel of said wheel while said click and foot are out of engagement therewith.

*Roller rotating.*—Upon depressing the key B⁴⁰ of the transmitter, its corresponding rod $a'$ passing upwardly and the points $a\ a^5$ closing the local circuit 2, 4, and 3 through the relays V V', the main line being opened at the points $w\ w'$, through the downward movement of the armature $v$ of the local relay V, and the circuit of the circuit-breaking-arm magnets F being opened at $x\ x'$, the arm C² is started in motion by its actuating-spring C³, and passes over the semicircular plate A' until intercepted by the rod $a'$. The armature U' of the main-line relay U opening the local relays R Q of the receiver at the points $u$ $u'$, and the armature R' of the local relay R opening the circuit of the type-wheel magnets K$^4$, de-energizing said magnets and freeing their armature $k^4$, the actuating-spring K$^7$ starts the said type-wheel shaft $k$, and therefore the type-wheel K, in motion. As the circuit-breaking arm C$^2$ of the transmitter engages with the rod $a'$, thereby opening the local circuits 2, 3, and 4 at the points $a$ $a^5$, and the armature of the local-relay magnets V closes the main line at the points $w$ $w'$, armature U' of the main-line relay U closes the local circuit of the local relay Q through the points $u$ $u'$, its armature closing, as shown by the heavy line in Fig. 44, the circuit of the circuit-closing magnet M, the brake-magnet L, and the printing-magnet O through the points $q^3$ $q^4$. As the circuit-breaking arm C$^2$ of the transmitter reaches the perpendicular rod $a'$, the forward movement of the type-wheel shaft $k$ of the receiver, which moves synchronously with said circuit-breaking arm, brings the governor K$^5$, fixed to the shaft $k$, into such position that the small peripheral recess $m^6$ thereof is brought immediately in front of the foot of the arm $m'$, carried by the armature-lever $m$, which foot immediately drops therein, as particularly shown in Figs. 31 and 45. As the armature of the printing-magnets O is drawn toward its magnets, carrying the printing-arm forward, the type-striking end of said arm is intercepted by the lug $k^{50}$, formed upon the type-wheel K, which lug occupies a position in alignment with the striking end of said arm, which would otherwise be occupied by a type N, and preventing the armature-stem from describing its full stroke, which would, in the ordinary printing operation, through the projection $o^4$, carried thereby, break the shunt-connection at the points $o^5$ $o^6$, the brake-magnets L having arrested the movement of the type-wheel in the position above described. As the foot of the arm $m'$ of the armature-lever $m$ passes to its position within the recess $m^6$ of the governor K$^5$, the contact $m^2$, carried by said armature-lever, closes through the contact $m^3$ wires 12, and battery 150, the circuit of the roller rotating magnets I$^6$. As said magnets are energized, (see Figs. 17 and 18,) their armature $i^6$ being drawn thereto and carrying its stem forward, the rack $i^5$, carried by said stem, which engages with the segmental gear $i^4$, formed on the movable disk I$^4$, held to the roller-bar I, carries said disk forward, the pawl $i$, carried by said disk which engages with the teeth of the ratchet-wheel I$^3$, fixed to the roller-bar I, carrying said ratchet-wheel forward and therefore turning the roller-bar I on its axis, the foot $i^7$, carried by the stem I$^5$, entering between the teeth of the gear-wheel I$^2$, fixed to the roller-bar I as the said bar is turned through the action of the pawl and checking the travel of said bar and roller beyond the length of movement intended. On releasing the key B$^{40}$ of the transmitter the local circuit through the local-relay magnet V$^2$ and the wires 2 and 3 is broken at the points $b^2$ B$^2$, opening the circuit of the brake-magnets D at the points $y$ $y^2$ of the local-relay magnets V$^2$, freeing the armature $c'$, carried by the spindle of the circuit-breaking arm, and closing the local circuit of the circuit-breaking-arm magnets F at the points $y$ $y'$ of the said local-relay magnets V$^2$ through the wires 1. The magnets F being energized and drawing their armature $f$ thereto, the circuit-breaking arm C$^2$ is carried back to its normal position. The local circuit of the local relay R of the receiver being shunted over wires 10, as shown by heavy lines in Fig. 44, the armature of the local relay R cannot be drawn to its normal position until the points $o^5$ $o^6$ are opened by action of the stem of the armature of the printing-magnet O, the striking end of the printing-arm $o'$ being against the lug $k^{50}$ of the type-wheel K and preventing engagement with the movable contact $o^5$ of the projection $o^4$ of the armature-stem $o$, and remaining in such position until the main line is again opened. A sufficient interval of time having elapsed for the roller-rotating devices to move said roller upon its axis, depression of the key B$^{30}$ of the transmitter closes by the points $a$ $a^5$ the circuit through the local-relay magnets V V', which opens the main line at $w$ $w'$ and the circuit of the circuit-breaking-arm magnets F also closing by the key-arm $b^2$ and the contact B$^2$ the circuit of the local relay V$^2$, further opening the circuit of the circuit-breaking-arm magnets F at the points $y$ $y'$ of the local-relay magnets V$^2$, the main-line relay U having at the same time opened the local circuit of the local relay Q at the points $u$ $u'$, allowing the armature Q' of the local relay Q to open the circuit of the circuit-closing magnets M, the brake-magnets L, and the printing-magnets O at the points $q^3$ $q^4$ of the local relay Q, enabling the printing-arm $o'$ to drop away from the lug $k^{50}$ of the type-wheel, and the actuating-spring K$^7$ to axially move said type-wheel through the full limit of travel of which it is operatively capable, said type-wheel remaining in the position to which it is carried by said spring until the arm C$^2$ of the transmitter has traveled from its starting-point to the rod $a'$, held up by the key B$^{30}$ and engages therewith. As the rod $a'$ is moved downwardly by engagement of the said arm C$^2$ therewith, the circuit of the local relays V and V' is broken and the main line closed at the points $w$ $w'$, the armature of the main-line relay U of the receiver being drawn to its magnets, thereby closing the local relay Q, which action closes the circuit of the circuit-closing magnets M, the brake-magnets L, and the printing-magnets O, allowing the armature of the printing-magnets, through the projection $o^4$, carried by its stem $o$, to open the shunt-circuit at the points $o^5$ $o^6$, which allows the local circuit to pass through the local-relay magnets R, opening the circuit of the circuit-closing magnets M, the brake-magnet L, and the printing-magnets O at the points $r^5 r^3$, returning the armature of the magnets M O (see Fig. 30) to their normal positions, a short lug $k^{70}$, or equivalent blank, formed upon the type-wheel K in lieu of the type N, having received the stroke of the end of the printing-arm $o'$ as the magnets O were energized and the type-wheel at the end of its said movement. The downward movement of the armature of the local relay R closing the circuit of the type-wheel magnet $K^4$ at the points $r^6 r^7$, the type-wheel is drawn back to its normal position, (see Fig. 42,) rewinding the actuating-spring upon the shaft $k$. The key $B^{30}$ of the transmitter being released, the circuit of the local relay $V^2$ is opened at the points $b^2 B^2$, opening the circuit of the brake-magnets D at the points $y y'$, and closing the circuit of the circuit-breaking-arm magnets F at the points $y y^2$, allowing the circuit-breaking arm $C^2$ to be drawn back to its normal position.

*Retracting and rotating the paper-roller.*—
Upon depressing the key $B^{10}$ of the transmitter its corresponding rod $a'$, passing upwardly and at the points $a a^5$ closing the local circuits 2, 4, and 3 through the relays V V′, the main line being opened at the point $w w'$ through the downward movement of the armature $v$ of the local relay V, and the circuit of the circuit-breaking-arm magnets F being opened at the points $x x'$ of the relay V′, the arm $C^2$ is started in motion by its actuating-spring and passed over the semicircular plate A′ until intercepted by the said rod $a'$. The armature U′ of the main-line relay U opening the local relays R and Q of the receiver at the points $u u'$, and the armature R′ of the relay R opening at the points $r^6 r^7$, circuit 8 of the type-wheel magnets $K^4$ (see Fig. 43) de-energizing said magnets and freeing their armature $k^4$, the actuating-spring $K^7$ starts the type-wheel shaft $k$, and therefore the type-wheel K, in motion. As the circuit-breaking arm $C^2$ engages with the rod $a'$, the local-relay circuits 2, 3, and 4 are opened at the points $a a^5$, and the armature of the local relay V closes the main line at the points $w w'$ of the said relay, the main-line relay U of the receiver closing the local circuit of the local relay Q through the points $u u'$, its armature closing the circuits, as shown by the heavy line, Fig. 44, of the circuit-closing magnet M, the brake-magnets L, and the printing-magnets O through the points $q^3 q^4$ of the local-relay magnets Q. As the circuit-breaking arm $C^2$ of the transmitter reaches the rod $a'$, the forward movement of the type-wheel shaft $k$ of the receiver brings the governor $K^5$, fixed to the type-wheel shaft $k$, into such position that the deep peripheral recess $m^7$ of said governor is brought immediately in front of the foot of the arm $m'$ of the armature-lever $m$, which foot immediately drops within said recess, as shown in Figs. 32 and 46, the armature of the printing-magnets O at the same time being drawn toward its magnets, carrying the printing-arm forward, the type-striking end of said arm being intercepted by the lug $k^{60}$, formed upon the type-wheel K, which lug occupies a position which would otherwise be occupied by a type N, and preventing the armature-stem from describing a full stroke, which would in ordinary printing operation, through its projection $o^4$, break the shunt-connection $o^5 o^6$, the brake-magnet L having simultaneously arrested the movement of the type-wheel. As the foot of the arm $m'$ of the armature-lever $m$ passes to its position within the recess $m^7$ of the governor $K^5$, the contact $m^2$, carried by said armature-lever, closes, through the contacts $m^3 m^4$ and the wires 12 and 13, the circuit of the roller-rotating magnets $I^6$ and the carriage-retracting magnets $J^9$, as shown by heavy lines in Fig. 46. As said magnets $I^6$ are energized, their armature $i^6$ moves the roller I′ upon its axis in the manner heretofore described. Simultaneously the armature $j^9$ is drawn toward its magnets $J^9$, its stem $j^{10}$ drawing, by means of its connection with the arm $j^{11}$, fixed to the shaft $j^{12}$, the detent $j^{13}$, carried by said shaft, (see Figs. 15, 16, and 34,) from the teeth of the ratchet-wheel $J^4$, allowing the spring $J^8$ to move the shaft $J^3$ and the gear-wheel $J^2$, fixed thereto rotatively, in the direction indicated by the curved arrow shown on the gear-wheel $J^2$, Fig. 15, said gear-wheel, by its engagement with the rack J′ of the carriage J, retracting said carriage and roller to their normal position, the click $j$ being held beyond engagement with the teeth of the ratchet-wheel $J^4$ by the bracket Z′ through the said rotative operation of said ratchet-wheel, and the said circuit of the circuit-closing magnets M, the brake-magnets L, the printing-magnets O, the roller-rotating magnets $I^6$, and the carriage-retracting magnets $J^9$ remaining closed until re-opened through the operation of the key $B^{30}$ of the transmitter. The downward strain upon the said key $B^{10}$ being released, the circut of the local relay $V^2$ is opened by the arm $b^2$ at the point $B^2$, and the circuit of the brake-magnets D opened at the points $y y'$ of the local relay $V^2$, closing the circuit of the circuit-breaking-arm magnets F at the points $y y^2$ of said local relay $V^2$, allowing the circuit-breaking arm to be drawn back to its normal position. The key $B^{30}$ being depressed closes through the points $a a^5$ the circuit of the local relays V V′, opening the main-line circuit at the points $w w'$ of the local relay V, also opening the circuit of the circuit-breaking-arm magnets F at the points $x x'$ of the local relay V′, the key-arm $b^2$ and contact $B^2$ closing the circuit of the local relay $V^2$ and further opening the circuit of the circuit-breaking-arm magnets F at the points $y y'$ of the local-relay magnets $V^2$. The main-line relay U having at the same time opened the local circuit of the local relay Q at the points $u u'$, the armature Q′ of the local relay Q opens at the points $q^3 q^4$ the circuit of the circuit-closing magnets M, the brake-magnets L, and the printing-magnets O, de-energization of the magnets M opening, through the movement of the armature-lever $m$ at the points $m^3 m^4$, the circuits of the roller-rotating magnets $I^6$ and the carriage-retracting magnets $J^9$, all of the armatures of the receiver employed in the said operation, except the armature $l'$, returning to their normal positions. The projection $o^4$ of the armature-stem of the printing-magnet O having opened the shunt-circuit $o^5 o^6$, allowing the local circuit to pass into the local relay R through wires 7, thereby drawing the armature $R'$ downward and closing the circuit of the type-wheel magnet $K^4$ at the points $r^6 r^7$, the type-wheel K is drawn back to its normal position. Upon releasing the key $B^{30}$ the circuit of the local-relay magnets $V^2$ closes the circuit of the circuit-breaking-arm magnets F at the points $y$ $y'$, the said arm $C^2$ being carried back to its normal position.

*The carriage-traversing indicator.*—The carriage-traversing-indicating devices, forming part of the transmitter shown in Figs. 1, 2, 8, 9, 10, and 41, are operated as follows: As each key B of the transmitter is depressed, closing the circuit of the local-relay magnets V V', and thereby opening the main-line circuit, which brings about action of the carriage-traversing magnets $J^7$ of the receiver, the armature of said magnets V' closes at the points $x$ $x^2$ the circuit of the indicator-magnets $G^5$ of the transmitter through the wires 6 and 1. As the said magnets are energized, their armature $g$, being drawn thereto, moves the pivoted arm $G^4$, by which it is carried, driving by means of the click $g^3$ the ratchet-wheel $G^3$ forward the distance circumferentially of one of its teeth, the movement of said ratchet-wheel carrying the pointer G, which projects from the spindle $G^2$, to which said ratchet-wheel is fixed, forward the distance of one space or point shown upon the index-plate $G'$, located upon the upper face of the base-plate A. As the depressing strain upon the key B is released, opening through the points $a$ $a^5$ the circuit of said local relays V V', closing the main-line circuit, the circuit of said magnets $G^5$ is opened, allowing said armature $g$, actuated by its retracting-spring $g^{15}$, to move back to its normal position, and the engaging end of the click $g^3$ to be drawn from the teeth of the ratchet-wheel, it being held out of operative position by means of engagement with the adjacently-located lug or post $g^8$, the said ratchet-wheel being prevented from escaping or receding from the position to which it was carried by the click by the arm or detent $G^6$, which is adapted (being normally held in operative engagement with said ratchet-wheel by a leaf-spring $g^{25}$) to yield sufficiently for the advancing movement of the teeth of said ratchet-wheel as the same is fed forward. The said index-plate $G'$ is provided with a number of points or subdivisions which correspond with the number of teeth of the rack $J^2$, forming part of the carriage J of the receiver, or with the number of operations of the roller-traversing magnets $J^7$ necessary to the carrying of said carriage from its normal position entirely through the length of travel of which it is capable across its base-plate A. The ratchet-wheel $G^3$ is provided with a number of teeth sufficient to enable through its successive or step-by-step operation the carrying of said pointer G from point to point over the whole number of subdivisions formed upon the said index-plate, the forward movement of said ratchet-wheel causing the gradual winding upon the spindle $G^2$ of the spring $G^7$, which is fixed thereto and to the standard $G^{10}$. As the said key $B^{10}$ is depressed for the purpose of bringing about, as hereinbefore described, retraction of the paper-roller carriage, and the circuit of said magnets $G^5$ is opened, the arm of said key $B^{10}$ moves the end of the detent $G^6$, withdrawing the engaging end thereof from the ratchet-wheel $G^3$. The click $g^3$ being held beyond engagement with the teeth of the ratchet-wheel, the actuating-spring $G^7$ turns the stem $G^2$ upon its axis, carrying simultaneously with the retraction of the paper-roller carriage the pointer G back to its starting position with reference to its index-plate $G'$.

*Speed-regulating devices.*—In order to effect corresponding speed of travel of the circuit-breaking arm and the type-wheel, when the same are allowed to act through the opening of the circuits of their respective magnets, the stems to which the springs carried by the shafts of said devices are fixed are capable through axial movement thereof of taking up or letting out said springs, thereby increasing or decreasing their tensional strain, which obviously increases or decreases the rapidity of axial movement of said shafts, and therefore of the devices which they carry.

Recurring to the devices for effecting vertical adjustment of the paper-roller: It being necessary that the types N should be driven in their printing operation to the full limit of their outward travel by the printing-arm $o'$ of the armature-stem $o$, in order that said stem can describe its full movement, and thereby through its projection $o^4$ open at the points $o^5 o^6$ the shunt-circuit 10, hereinbefore described, the use of paper of varying thickness, or the employment of several sheets, necessary to the making of manifold copies of matter upon the roller, would prevent the full outward or printing movement of said types, and therefore the proper action of said armature-stem, unless means for effecting vertical adjustment of said roller were present. It may be noted that while the type-wheel K, herein shown, is preferably diamagnetic, with the armature $l'$ fixed thereto, the said type-wheel may be made of such metal as would for all practical purposes make the same an armature for the brake-magnets L, thus enabling the armature $l'$ to be dispensed with. It may be further noted that as my transmitter and receiver are worked in local circuits (the main line being arranged as in the ordinary Morse system) they can be worked in any other arrangement of main-line circuits having repeating-relays—as, for example, if placed in the circuit of a duplex or quadruplex system the transmitting-wires of such system would be run into the points $w$ $w'$ of my transmitter, the signals of my transmitter being repeated over the circuits of such duplex or quadruplex system by the transmitter of such system. The main-line relay of my receiver being connected with the repeating-points of the receiving-relay used in such duplex or quadruplex system would receive such signals as readily as if the same were received through a single wire. It may also be noted that while I have described herein the main-line circuit as being normally closed and the action of the receiving-instrument as depending upon the length of time which shall supervene between the opening and closing of the main-line circuit by the transmitter I particularly wish to be understood as not limiting myself to such electrical condition of the main line, as it is possible by simply inverting the operative arrangement of certain of the relay contact-points to effectively employ my transmitting and receiving instruments with a normally-opened main-line circuit, the action of the receiving-instrument in such case depending upon the length of time which supervenes between the closing and opening of the main-line circuit.

I have not deemed it necessary to show a main-line relay at the transmitter end of the system, it being obvious that one may be used for the purpose of enabling the sending-operator to know that the main line is in perfect working condition.

Manifestly other means than the particular forms of mechanical construction herein described and shown may be used in carrying out the general features of my invention, which is therefore not limited in its scope to the particular devices herein shown, except as set forth in the appended claims; but said invention embraces all devices constructed and operating upon the same general principles embodied in the devices and operative arrangements of devices herein described and shown.

Having thus fully set forth my invention, what I claim as new, and desire to secure by Letters Patent, is—

1. In telegraph apparatus, the combination, with the main line, of a transmitter comprising mechanism for reversing the normal condition of the main-line circuit and for holding said main-line circuit in said reversed condition, and differential mechanism arranged to restore the normal condition of said circuit at the ends of different periods of time after said normal condition has been reversed, and a series of keys, each arranged and adapted to operate the mechanism that reverses the condition of the main-line circuit, and arranged and adapted also to bring into action its corresponding part of the differential mechanism for restoring the normal condition of the main-line circuit, whereby by the operation of the different keys the passage of current over the main line can be differentially controlled to impart correspondingly-differential movements to appropriate mechanism of a receiving-instrument, substantially as set forth.

2. In telegraphic apparatus, the combination, with the main line, of a transmitter comprising mechanism for opening and holding open the main-line circuit, differential mechanism for closing the main-line circuit at the ends of different periods of time after the opening of said circuit, and a series of keys, each arranged to operate the circuit-opening mechanism and to bring its corresponding individual circuit-closing mechanism into action, whereby by the operation of the different keys the passage of current over the main line can be differentially controlled to impart correspondingly-differential movements to appropriate mechanism of a receiving-instrument, substantially as described.

3. The combination, with the main line, of mechanism for opening and closing the circuit of said main line, comprising a series of keys, a local circuit provided with a relay for making and breaking the main-line circuit, means—such, for example, as a key-lever and suitable connections—for determining the passage of current in said local circuit operatively connected with each of said keys, a movable part—such, for example, as an arm—for controlling the passage of current through said local ciricuit, means for advancing and retracting said movable part from and to a normal position, and a series of individual contact-points operatively connected with corresponding keys of said series and arranged in the path of travel of said movable part at different distances from its normal position, substantially as described.

4. The combination, with the main line, of mechanism for opening and closing the circuit of said main line, comprising a series of keys, a local circuit provided with a relay for making and breaking the main-line circuit, means for closing said local circuit operatively connected with each of said keys, a movable arm for opening said local circuit, means for retracting and advancing said arm and for holding the same at different points of its travel, and a series of individual contact-points operatively connected with corresponding keys of said series and arranged in the path of travel of said movable arm at different distances from its normal position.

5. In a telegraphic transmitter, the combination of a movable circuit-breaking arm, a magnet in a closed circuit suitably connected with said arm to hold it in its normal position, means for actuating said arm through its forward movement, a series of movable devices for opening the circuit of said magnet and for extending into the path of travel of said arm, and a magnet having an armature for arresting the movement of said arm as it is intercepted by said movable devices, substantially as described.

6. The combination, with the main line, of mechanism for opening and closing the circuit of said main line, comprising a series of keys, a local circuit provided with a relay for making and breaking the main-line circuit, mechanism—such, for example, as a key-lever and suitable connections—for determining the passage of current in said local circuit operatively connected with each of said keys, a movable part—such, for example, as an arm—for controlling the passage of current through said local circuit, a magnet, and an armature for said magnet operatively connected with said movable arm to move the same in one direction, suitable means for moving said arm in the opposite direction, and a series of individual contact-points operatively connected with corresponding keys of said series and arranged in the path of the travel of said movable arm at different distances from its normal position, substantially as described.

7. The combination, with the main line, of mechanism for opening and closing the circuit of said main line, comprising a series of keys, a local circuit provided with a relay for making and breaking the main-line circuit, mechanism for determining the passage of current in said local circuit operatively connected with each of said keys, a movable part—such, for example, as an arm—for controlling passage of current through said local circuit, a magnet and an armature for effecting the movement of said arm in one direction, and suitable means for connecting said movable arm with said armature, a magnet having an armature suitably connected with said arm for arresting the position of said arm, suitable relays in the circuits of said magnets for controlling the passage of current therethrough, and a series of individual contact-points operatively connected with corresponding keys, substantially as described.

8. In telegraphic apparatus, the combination, with a main line, of a transmitter having circuit opening and closing mechanism, comprising a series of keys, a local circuit provided with a relay for making and breaking the main-line circuit, a series of movable contact-points corresponding to and connected with the individual keys, whereby the said local circuit may be made or broken, a movable circuit-breaking arm, and suitable means for advancing said arm from and retracting it to a normal position, said movable contact-points being arranged at different distances from the normal position of said movable arm, substantially as described.

9. In telegraph-transmitters, the combination of a movable circuit-breaking arm, a magnet in a normally-closed circuit adapted to hold said arm in normal position, a local relay which controls said magnet, a series of contact members electrically connected with said relay and with a local relay adapted to control the main-line circuit, a corresponding series of movable rods electrically connected with said relays and adapted through said contact members to operate said relays and therethrough control the main-line circuit and the circuit of the magnet which holds said arm in normal position, devices for actuating said arm through its forward movement, and a series of keys each adapted to normally hold a corresponding rod out of operative position to release said rod and to enable the same to pass to operative position, whereby contact is made with said contact member, the main-line circuit is opened, the magnet which holds the circuit-breaking arm in normal position allows the same to be carried through its forward movement, and said rod is engaged by said arm and driven thereby from contact with said contact member, substantially as described.

10. In telegraph-transmitters, the combination of a movable circuit-breaking arm, a magnet in a normally-closed circuit for holding said arm in its normal position, a local relay adapted to open said circuit of said magnet, a series of contact members electrically connected with said magnet and with a local relay adapted to control the main-line circuit, a corresponding series of movable devices, preferably in the form of rods, connected with said relays and adapted to make contact with said contact members and therethrough operate said relays to open the main-line circuit and the circuit of the magnet which holds said arm in normal position to be engaged by said circuit-breaking arm and thereby caused to close the main-line circuit through the relay which controls the same, devices for actuating said arm through its forward movement, a series of finger-keys adapted to normally hold out of operative position and release said movable devices, each electrically connected with a local relay adapted to further open and to close the circuit of the said magnet which holds said arm in normal position, and a contact electrically connected with the said next above-described local relay adapted to be engaged by said key when its corresponding said movable device is released and close the circuit of said last above-described relay, whereby the circuit of said magnet which holds the circuit-breaking arm in normal position is held open and the said arm held to said rod until the key is removed from said contact, substantially as set forth.

11. In a telegraphic transmitter, the combination, with suitable co-operative parts, of an axially-movable circuit-breaking arm, a pinion fixed to the spindle of said arm, a rack which engages with said pinion, and a magnet having an armature to move said rack and therethrough axially move said circuit-breaking arm, substantially as set forth.

12. In telegraphic apparatus, the combination, with suitable co-operative parts, of an axially-movable circuit-breaking arm and a magnet which holds said arm in normal position, and the actuating-spring $C^3$, substantially as and for the purpose set forth.

13. In telegraphic apparatus, the combination, with suitable co-operative parts, of an axially-movable circuit-breaking arm, its spindle C, an actuating-spring $C^3$, and devices for taking up or letting out said spring, whereby the speed of the circuit-breaking arm through its forward movement is increased or decreased, substantially as described.

14. In telegraphic apparatus, the combination, with a movable part and suitable means for operating the same, of a brake-magnet and an armature for said magnet connected with said movable part to travel in unison therewith, whereby by the energization of said magnet the armature and movable part can be arrested, substantially as described.

15. In a recording-telegraph receiver, the combination of an axially-movable printing-wheel, a magnet for holding said printing-wheel in normal position and for retracting the same thereto, devices for actuating said printing-wheel through its forward movement, and a magnet for arresting the forward movement of said printing-wheel and for holding the same in its arrested position pending its printing operation, substantially as described.

16. In a recording-telegraph receiver, the combination of a movable type-carrier, devices for holding the type-carrier in normal position and retracting the same, devices for actuating the said type-carrier through its forward movement, a brake-magnet adapted to arrest the forward movement of said type-carrier and to hold the same in its arrested position, a magnet adapted to effect printing operation of the type carried by said carrier, a longitudinally traversable paper-carrier and devices whereby the paper-carrier is fed forward coincidental with the operation successively of the type-carrier, and is retracted to its normal or starting position, a magnet adapted to operate the devices which intermittingly feed said paper-carrier forward, and a magnet adapted to effect retraction of said paper-carrier to its starting or normal position, substantially as described.

17. In a recording-telegraph receiver, the combination of a movable type-carrier, a magnet for holding said type-carrier in normal position and for retracting the same thereto, devices for actuating said type-carrier through its forward movement, a brake-magnet for arresting the forward movement of said carrier and for holding the same in its arrested position pending the printing operation of said carrier, and a printing-magnet in the circuit of said type-carrier holding and retracting magnet and said brake-magnet adapted by its armature to effect printing operation of said type-carrier and to bring about operation of said type-carrier holding and retracting magnet and said brake-magnet, whereby said type-carrier is released, retracted to, and held in its normal position, substantially as described.

18. In a recording-telegraph receiver, the combination of a movable type-carrier, a magnet adapted to hold said type-carrier in its normal position and to retract the same thereto, devices for actuating the said type-carrier through its forward movement, a brake-magnet adapted to arrest the forward movement of said type-carrier and to hold the same in its arrested position, a paper-carrier capable of longitudinal and axial motion, mechanical devices for retracting and axially moving said paper-carrier, magnets adapted to actuate said mechanical devices, a circuit-closing magnet the armature of which is adapted to close the circuit which operates the magnets which actuate the mechanical devices for retracting and axially moving said paper-carrier, a governor synchronously movable with said type-carrier adapted to control the position and movement of the armature of said circuit-closing magnet, a magnet the armature of which is capable of effecting printing operation of said type-carrier and opening the circuit of said brake-magnet and closing the circuit of said type-carrier holding and retracting magnet, and devices forming part of said type-carrier which prevent the full action of said armature, whereby in the retracting and axial operation of said paper-carrier the type-carrier is rigidly held by said brake-magnet and the type-carrier holding and retracting magnet circuit is held open, substantially as set forth.

19. In a recording-telegraph, the combination, with a main line and a receiver having a movable type-carrier, of a transmitting instrument for determining the movement of said type-carrier, comprising mechanism for reversing the normal condition of the main-line circuit and for holding said main-line circuit in said reversed condition, and differential mechanism arranged to restore the normal condition of said main-line circuit at the ends of different periods of time after said normal condition has been reversed, and a series of keys each arranged to operate the mechanism that reverses the condition of the main-line circuit, each arranged also to bring into action its corresponding part of the differential mechanism for restoring the condition of the main-line circuit, substantially as described.

20. In a recording-telegraph, the combination, with the main line, of a receiver having a movable type-carrier and mechanism for advancing said type-carrier from and restoring it to a normal position after each printing operation, and for arresting it at different points of its travel, and a transmitter having a series of keys, mechanism connected with each of said keys for opening the main-line circuit, differential mechanism for closing said main-line circuit, operatively connected with each of said keys and arranged to close said main-line circuit at the ends of different periods of time after said circuit has been opened, whereby the said main-line circuit can be opened for different predetermined periods of time corresponding with the different character-keys in order to effect the corresponding movement of the type-carrier, substantially as described.

21. In a recording-telegraph, the combination, with the main line, of a receiver having a movable type-carrier, a transmitter comprising a series of character-keys, differential circuit opening and closing mechanism having individual contact-points corresponding to said keys and operatively connected therewith, and having a movable part arranged to move synchronously with the type-carrier of the receiver and to engage said contact-points, and means for holding said movable part in a normal position unequally distant from the said individual contact-points, and means for retracting said movable part to said normal position after each printing operation of the receiving-instrument, substantially as described.

22. In a recording-telegraph, the combination, with a main line and a receiver provided with printing devices and means for bringing said devices into printing action, and a longitudinally-movable paper-carrier, and means for intermittently advancing said paper-carrier coincidently with each successive operation of said printing device, of a transmitter provided with mechanism for automatically opening and closing the main line circuit, and thereby putting in action said printing devices and said paper-carrier-operating mechanism, a system of keys operatively connected with said main-line-circuit opening and closing devices, and an indicator-pointer also operatively connected with said opening and closing devices, and means for imparting movement to said indicator-pointer for a definite distance at each action of said main-line-circuit opening and closing devices to indicate at the transmitter the position occupied by the paper-carrier of the receiver, substantially as set forth.

23. In a recording-telegraph, the combination, with a receiver having a movable type-carrier and means for advancing said type-carrier, of a magnet located in a normally-closed circuit for restoring said type-carrier to a normal position, and a transmitter comprising a series of differential circuit opening and closing devices, whereby the main-line circuit can be opened and closed for different predetermined periods of time, in order to impart different extents of movement to said type-carrier and in order to restore the same to its normal position, substantially as described.

24. In a recording-telegraph, the combination, with a receiver having a movable type-carrier and means for advancing said type-carrier, of a brake-magnet in a local circuit of the receiver for arresting the movement of said type-carrier, a main line, and a transmitter provided with mechanism to differentially open and close the main-line circuit and therethrough put in action the said brake-magnet, whereby by the opening and closing of the main-line circuit different extents of movement can be imparted to said type-carrier and the said brake-magnet can be brought into operation to arrest the same, substantially as described.

25. In a recording-telegraph, the combination, with a main line, of a receiving-instrument comprising an axially-movable paper-carrier, a magnet in a local circuit, an armature for said magnet, and devices for co-operating with said magnet for imparting circular motion to said roller, a circuit-closing magnet in a local circuit, and an armature for said magnet adapted to close the circuit of and therethrough actuate the magnet that controls the devices for imparting circular motion to the paper-roller, an axially-movable type-carrier, a brake-magnet in a normally-open local circuit for stopping the forward movement of said type-carrier, and an armature-governor connected to move synchronously with said type-carrier, constructed and arranged substantially as described.

26. In a recording-telegraph, the combination, with a main line, of a receiver provided with a movable type-carrier and mechanism for bringing said type-carrier into position for printing, a longitudinally-movable paper-carrier and mechanism for intermittently advancing said paper-carrier coincidently with the successive operations of said type-carrier, a transmitter provided with mechanism for opening and closing the main-line circuit, and thereby putting in action said type-carrier and said paper-carrier mechanism, and an indicator-pointer operatively connected with said opening and closing mechanism, and means for imparting movement to said indicator-pointer for a definite distance at each action of said circuit opening and closing mechanism, and thereby indicating at the transmitter the position occupied by the paper-carrier of the receiver, substantially as described.

27. In a recording-telegraph, the combination, with a main line and with a transmitter provided with keys for opening and closing the main-line circuit, of a receiver provided with a paper-carrier and means for advancing said paper-carrier at each operation of said keys of the transmitter, and an indicator forming part of the transmitter, suitable connections for enabling said indicator to move coincidently with the movement of said paper-carrier, and a transmitter-key for operating said circuit opening and closing devices and provided with suitable connections to simultaneously bring into operation the devices for causing the retraction of said paper-carrier and retraction of said indicator, substantially as described.

JOHN B. ODELL.

Witnesses:
  F. A. CASE,
  GEO. W. LELLIN.